US012790839B2

(12) United States Patent
Eckhardt et al.

(10) Patent No.: US 12,790,839 B2
(45) **Date of Patent: *Nov. 10, 2026**

(54) BRAKE/BALLAST ASSEMBLY FOR A MOVABLE STRUCTURE

(71) Applicant: AQUA CONSCIENCE HOLDINGS LLC, Lancaster, PA (US)

(72) Inventors: Bartley J. Eckhardt, Lancaster, PA (US); Bret W. Johnson, Lancaster, PA (US); Marcus A. Mazza, Lancaster, PA (US); Chad Phillips, Lancaster, PA (US); Jorge Torres, Lancaster, PA (US)

(73) Assignee: AQUA CONSCIENCE HOLDINGS LLC, Lancaster, PA (US)

( * ) Notice: Subject to any disclaimer, the term of this patent is extended or adjusted under 35 U.S.C. 154(b) by 1490 days.

This patent is subject to a terminal disclaimer.

(21) Appl. No.: 17/401,666

(22) Filed: Aug. 13, 2021

(65) Prior Publication Data

US 2023/0047812 A1 Feb. 16, 2023

(51) Int. Cl.

*E04G 5/02* (2006.01)
*B62B 5/04* (2006.01)
(Continued)

(52) U.S. Cl.

CPC ............ *E04G 5/025* (2013.01); *B62B 5/0442* (2013.01); *B62B 5/049* (2013.01); *E06C 1/39* (2013.01);
(Continued)

(58) Field of Classification Search

CPC .. E04G 5/025; E04G 5/02; E04G 1/24; E04G 2001/242; E04G 2001/244;
(Continued)

(56) References Cited

U.S. PATENT DOCUMENTS 1,383,468 A 7/1921 Ferdinand
1,677,061 A 7/1928 James
(Continued)

*Primary Examiner* — Daniel P Cahn
*Assistant Examiner* — Shiref M Mekhaeil
(74) *Attorney, Agent, or Firm* — Potomac Law Group PLLC

(57) ABSTRACT

A brake/ballast assembly for a movable structure. The brake/ballast assembly includes a movable brake/ballast plate movable between a movable brake/ballast plate first position in which the movable brake/ballast plate is positioned proximate a fixed member and a movable brake/ballast plate second position in which the movable brake/ballast plate is spaced from the fixed member. An engagement member is connected to the movable brake/ballast plate. The engagement member is movable between an engagement member first position and an engagement member second position. When the engagement member is in the engagement member first position, the movable brake/ballast plate is provided in the movable brake/ballast plate first position allowing the movable structure to be moved along a surface. When the engagement member is in the engagement member second position, the movable brake/ballast plate is provided in the movable brake/ballast plate second position preventing the movable structure from moving relative to the surface.

13 Claims, 14 Drawing Sheets

(51) Int. Cl.
*E06C 1/39* (2006.01)
*E06C 1/397* (2006.01)
*E04G 1/24* (2006.01)

(52) U.S. Cl.
CPC ........ *E06C 1/397* (2013.01); *E04G 2001/242* (2013.01)

(58) Field of Classification Search
CPC ......... E04G 2001/246; E04G 2001/248; E06C 1/39; E06C 1/397; B62B 5/0442; B62B 5/049; B62B 5/04; B62B 5/0447; B62B 5/0433
See application file for complete search history.

(56) References Cited

U.S. PATENT DOCUMENTS

| | | | | | |
|---|---|---|---|---|---|
| 1,940,523 | A | 12/1933 | Wright | | |
| 2,624,590 | A * | 1/1953 | Tilton | B25H 5/00 | 182/180.1 |
| 2,775,488 | A * | 12/1956 | Wingrove | E06C 1/397 | 182/132 |
| 2,897,910 | A * | 8/1959 | Steely | A47B 31/00 | 182/15 |
| 2,922,494 | A * | 1/1960 | Clark, Jr. | B60B 33/0089 | 188/5 |
| 2,941,626 | A * | 6/1960 | Heiden | A61G 7/1046 | 292/181 |
| 2,945,242 | A * | 7/1960 | Heiden | A61G 7/1046 | 248/363 |
| 3,179,438 | A * | 4/1965 | Field | B60B 33/06 | 280/43.14 |
| 3,231,050 | A * | 1/1966 | Belyeu | B62B 5/049 | 188/5 |
| 3,291,254 | A * | 12/1966 | Mihalik | E06C 1/397 | 182/15 |
| 3,422,929 | A * | 1/1969 | Oja | B62B 5/049 | 188/23 |
| 3,715,015 | A * | 2/1973 | Morris | B62B 5/049 | 248/354.6 |
| 4,166,516 | A * | 9/1979 | Thurmond, Jr. | E06C 1/397 | 182/15 |
| 4,275,881 | A | 6/1981 | Armstrong | | |
| 5,035,445 | A * | 7/1991 | Poulin | B60T 1/14 | 280/79.11 |
| 5,323,879 | A * | 6/1994 | Poulin | B62B 5/049 | 188/19 |
| 5,366,231 | A * | 11/1994 | Hung | A47C 7/006 | 280/87.051 |
| 5,722,506 | A * | 3/1998 | Takai | E04G 1/24 | 182/16 |
| 5,882,024 | A * | 3/1999 | Wilson | B62M 29/02 | 280/219 |
| 5,941,341 | A * | 8/1999 | Gillis | E06C 1/39 | 182/15 |
| 6,079,941 | A * | 6/2000 | Lee | B62B 3/04 | 414/812 |
| 6,390,759 | B1 * | 5/2002 | Novak | B62B 5/049 | 414/469 |
| 6,523,640 | B1 * | 2/2003 | Young | E06C 1/39 | 182/15 |
| 6,594,951 | B1 * | 7/2003 | Reynolds | A47G 7/041 | 47/39 |
| 6,860,496 | B2 * | 3/2005 | Novak | B62B 5/049 | 414/469 |
| 7,431,259 | B2 * | 10/2008 | Tung | E04H 12/2284 | 248/521 |
| 7,740,106 | B2 * | 6/2010 | Vetesnik | A62B 35/0056 | 182/180.2 |
| 7,828,115 | B2 * | 11/2010 | Sayles | E06C 1/39 | 182/15 |
| 7,886,380 | B2 * | 2/2011 | Hornbach | A47C 19/045 | 5/613 |
| 9,109,396 | B2 * | 8/2015 | William | E04G 1/24 | |
| 9,844,868 | B1 * | 12/2017 | Abbey | B25D 17/24 | |
| 10,123,842 | B2 * | 11/2018 | Iceman | A61B 34/20 | |
| 10,231,792 | B2 * | 3/2019 | Shiels | A61B 50/13 | |
| 11,365,557 | B2 * | 6/2022 | Ma | E04H 12/2238 | |
| 12,007,065 | B2 * | 6/2024 | Ma | E04H 12/2238 | |
| 2004/0035636 | A1 | 2/2004 | Julien | | |
| 2005/0189005 | A1 * | 9/2005 | Smith | G09F 23/00 | 135/16 |
| 2008/0056871 | A1 * | 3/2008 | Morgan | B62B 3/0643 | 414/800 |
| 2008/0088102 | A1 | 4/2008 | Campbell et al. | | |
| 2008/0111046 | A1 * | 5/2008 | Tung | A45B 17/00 | 248/521 |
| 2008/0174081 | A1 * | 7/2008 | Wu | B62B 5/04 | 188/2 R |
| 2011/0014026 | A1 * | 1/2011 | Benzing | E04G 25/06 | 187/244 |
| 2012/0025050 | A1 | 2/2012 | Ma | | |
| 2013/0134285 | A1 | 5/2013 | Weng | | |
| 2015/0166198 | A1 * | 6/2015 | Hokanson | E06C 1/12 | 182/101 |
| 2016/0084427 | A1 * | 3/2016 | Craig | F16M 3/00 | 248/506 |
| 2017/0114563 | A1 | 4/2017 | Ye | | |
| 2017/0143571 | A1 | 5/2017 | Wilson et al. | | |
| 2017/0369088 | A1 * | 12/2017 | Ingram | B62B 5/049 | |
| 2018/0312185 | A1 | 11/2018 | Weitzel et al. | | |
| 2019/0063103 | A1 | 2/2019 | Siegenthaler | | |
| 2019/0090964 | A1 * | 3/2019 | Rosenberg | B25J 5/007 | |
| 2019/0300038 | A1 | 10/2019 | Hynes | | |
| 2020/0141150 | A1 | 5/2020 | Ma | | |
| 2020/0208429 | A1 * | 7/2020 | Ma | E04H 12/2238 | |
| 2020/0262496 | A1 | 8/2020 | Wilson et al. | | |
| 2023/0286562 | A1 * | 9/2023 | Lewis | B62B 5/0404 | |

* cited by examiner

BRAKE/BALLAST ASSEMBLY FOR A MOVABLE STRUCTURE

FIELD OF THE INVENTION

The present invention relates generally to a braking system for a movable structure. More particularly, the invention relates to a brake/ballast assembly which is movable between a braking position and a non-braking position.

BACKGROUND OF THE INVENTION

Various larger structures must be moved periodically from one location to another within a designated area. Platforms, scaffolds and stairs are an examples of such structures. The structures often have raised platforms and may include ballast or additional weight to provide stability to the platforms. These platforms are movable to allow for proper positioning and to allow for storage as needed. However, while the platforms and other structures may be movable, a group of individuals are often required to move the platform or structure. Alternatively, or in addition, once moved, many platforms or structures do not provide sufficient locking or braking mechanisms to properly stabilize the platforms or structures to prevent in inadvertent or unwanted movement of the platforms or structures.

It would be beneficial to provide a platform or structure which overcomes the problems of the known art. In particular, it would be beneficial to provide a platform (such as a lifeguard observation platform or station) or structure which is easily movable and which provides safety and stability when and after the platform or structure is moved to the proper position, thereby preventing the unwanted movement of the platform or structure.

SUMMARY OF THE INVENTION

An object is to provide a structure or platform, such as, but not limited to, a lifeguard observation station, platform, scaffold or stairs, which is easily movable.

An object is to provide a movable structure or platform which has a braking mechanism which provides stability to the structure or platform when properly positioned to prevent the unwanted movement of the structure or platform.

An object is to provide a movable structure or platform which is easily movable when desired, but which provides a failsafe braking mechanism to prevent any unwanted or uncontrolled movement of the movable structure or platform.

An object is to provide a brake assembly which can be used with different movable structures or platforms to control the movement of the movable structures or platforms and add stability.

An object is to provide a brake assembly which adds additional ballast to the movable structure or platform to increase the stability of the structure or platform when the structure or platform is in a non-movable position.

An embodiment is directed to a brake/ballast assembly for a movable structure. The movable structure has a support structure with a fixed member. The brake/ballast assembly includes a movable brake/ballast plate movable between a movable brake/ballast plate first position in which the movable brake/ballast plate is positioned proximate the fixed member and a movable brake/ballast plate second position in which the movable brake/ballast plate is spaced from the fixed member. One or more braking members are provided on the movable brake/ballast plate. An engagement member is connected to the movable brake/ballast plate. The engagement member is movable between an engagement member first position and an engagement member second position. When the engagement member is in the engagement member first position, the movable brake/ballast plate is provided in the movable brake/ballast plate first position allowing the movable structure to be moved along a surface. When the engagement member is in the engagement member second position, the movable brake/ballast plate is provided in the movable brake/ballast plate second position preventing the movable structure from moving relative to the surface.

An embodiment is directed to a movable structure having a base with a fixed member. A movable brake/ballast plate is provided and is movable between a movable brake/ballast plate first position in which the movable brake/ballast plate is positioned proximate the fixed member and a movable brake/ballast plate second position in which the movable brake/ballast plate is spaced from the fixed member. One or more braking projections extending from the movable brake/ballast plate in a direction away from the fixed member. When the movable brake/ballast plate is provided in the movable brake/ballast plate first position, the movable structure is movable along a surface, when the movable brake/ballast plate is provided in the movable brake/ballast plate second position, the movable structure is prevented from moving relative to the surface.

An embodiment is directed to a movable structure which is configured to support at least one person thereon. The movable structure includes a movable brake/ballast assembly which has weight to stabilize the movable structure. The movable brake/ballast assembly has a movable brake/ballast plate. The movable brake/ballast plate is movable between a movable brake/ballast plate first position in which the movable brake/ballast plate is spaced from a surface on which the movable structure is positioned and a movable brake/ballast plate second position in which the movable brake/ballast plate is in engagement with the surface. When the movable brake/ballast plate is provided in the movable brake/ballast plate first position, the movable structure is movable along the surface, when the movable brake/ballast plate is provided in the movable brake/ballast plate second position, the movable structure is prevented from moving relative to the surface.

In various embodiments the positioning projections are cylindrical members which extend through projection member receiving openings in the fixed member. The positioning projections have shoulders which extend from side surfaces of the positioning projections. The shoulders are spaced from the fixed member when the movable brake/ballast plate is positioned in the movable brake/ballast plate first position. The shoulders are engagement with the fixed member when the movable brake/ballast plate is positioned in the movable brake/ballast plate second position. The fixed member has weight to act as a ballast for the movable structure to maintain stability of the movable structure, wherein in the movable brake/ballast plate second position, the shoulders of the movable brake/ballast plate engage the fixed member and act as additional ballast for the movable structure to maintain stability of the movable structure.

Other features and advantages of the present invention will be apparent from the following more detailed description of the preferred embodiment, taken in conjunction with the accompanying drawings which illustrate, by way of example, the principles of the invention.

DETAILED DESCRIPTION OF THE INVENTION

Figure 1:
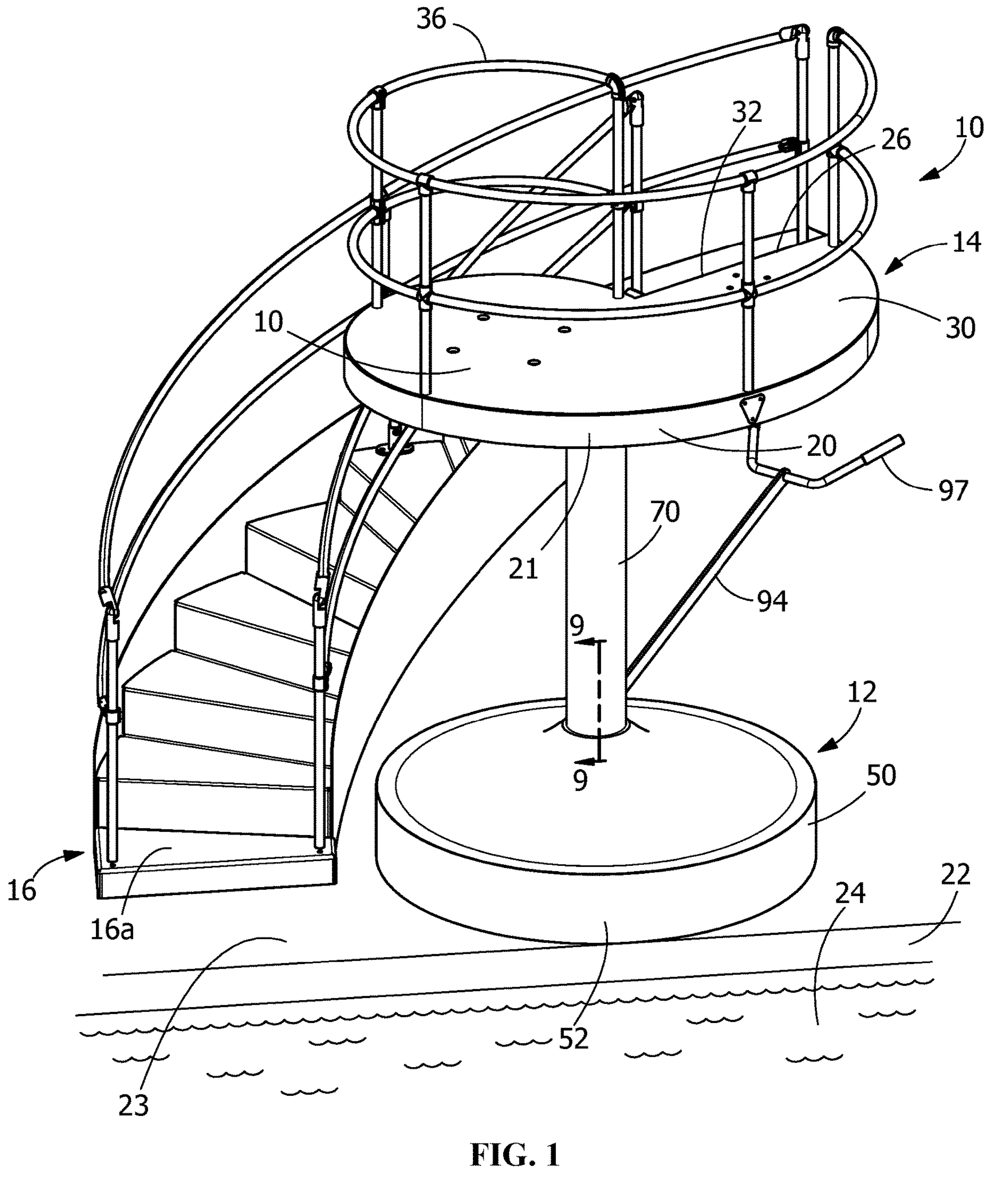
FIG. 1 is a front perspective view of an illustrative embodiment of a lifeguard observation station positioned proximate an edge of a pool or body of water.

The description of illustrative embodiments according to principles of the present invention is intended to be read in connection with the accompanying drawings, which are to be considered part of the entire written description. In the description of embodiments of the invention disclosed herein, any reference to direction or orientation is merely intended for convenience of description and is not intended in any way to limit the scope of the present invention. Relative terms such as "lower," "upper," "horizontal," "vertical," "above," "below," "up," "down," "top" and "bottom" as well as derivative thereof (e.g., "horizontally," "downwardly," "upwardly," etc.) should be construed to refer to the orientation as then described or as shown in the drawing under discussion. These relative terms are for convenience of description only and do not require that the apparatus be constructed or operated in a particular orientation unless explicitly indicated as such. Terms such as "attached," "affixed," "connected," "coupled," "interconnected," and similar refer to a relationship wherein structures are secured or attached to one another either directly or indirectly through intervening structures, as well as both movable or rigid attachments or relationships, unless expressly described otherwise. Moreover, the features and benefits of the invention are illustrated by reference to the preferred embodiments. Accordingly, the invention expressly should not be limited to such preferred embodiments illustrating some possible non-limiting combination of features that may exist alone or in other combinations of features, the scope of the invention being defined by the claims appended hereto.

As shown in FIG. 1, an illustrative embodiment of a lifeguard observation station 10 according to the present invention has a base member 12, a platform member 14, and stairs 16. The platform member 14 is positioned above the base member 12.

The platform member 14 has a first side 20, with at least a portion 21 of the first side 20 of the platform member 14 being configured to be positioned proximate to, in-line, or extending over an edge 22 of a pool or body of water 24. The platform member 14 has a second side 26 from which the stairs 16 extend. In the embodiment shown, the second side 26 is opposed to the first side 20. However, the second side 26 may be positioned at different orientations relative to the first side 20, allowing the stairs to extend from other directions of the platform member 14.

In the embodiment shown, the platform member 14 has a volute shape, as best viewed in FIG. 1. The volute shape allows the platform member 14 to have a generally circular or elliptical portion 28 with an extension portion 30 extending from the circular or elliptical portion 28. The extension portion 30 has a generally straight surface 32 from which the stairs 16 extend.

The circular or elliptical portion 28 of the platform member 14 has a sufficient surface area to allow the lifeguard to move about the platform member 14 to allow the lifeguard to acquire an optimum line-of-sight to the pool or body of water 24.

The platform member 14 has a railing 36 provided about the circumference thereof. The railing 36 does not extend across the straight surface 32 of the second side 26, thereby allowing the lifeguard to access the stairs 16 which extend from the straight surface 32. The railing 36 is of sufficient height to prevent the lifeguards from falling from the platform member 14. In addition, the railing 36 is constructed in a manner to provide sufficient safety support while providing unobstructed line-of-sight of the pool or body of water 24. While the railing 36 is shown, different shapes and configurations of railing may be used, including, but not limited, to plastic or tempered glass.

As previously stated, at least a portion 21 of the first side 20 of the platform member 14 is configured to be positioned proximate to, in-line, or to extend over the edge 22 of the pool or body of water 24, as best shown in FIG. 1. This allows the lifeguard to have a line-of-sight of the pool or body of water 24, including directly at the edge 22 of a pool or body of water 24, eliminating the blind spot at the edge 22 of a pool or body of water 24 associated with known lifeguard stations.

As the proper number and positioning of lifeguards has a significant potential to reduce the risk of drowning, the lifeguard observation station 10 is configured to allow the platform member 14 to be positioned proximate to, in-line, or to extend over the edge 22 of the pool or body of water 24 to provide the lifeguards with proper views of the pool, including the edge 22 of a pool or body of water 24 proximate to which the lifeguard observation station 10 is positioned.

The platform member 14 has a platform or deck 38 upon which the lifeguard is positioned. A securing member or support post receiving member (not shown) extends from the deck 38 toward the base 12. The support post receiving member can be made from any material having the strength characteristics required to support the deck 38 and lifeguards.

The base member 12 has a generally conical configuration. A portion 52 of an edge 50 of the base member 12 is configured to be positioned proximate to or in-line with the edge 22 of the pool or body of water 24. The portion 52 of the edge 50 of the base member 12 is offset from the portion 21 of the first side 20 of the platform member 14, thereby allowing the portion 21 of the first side 20 of the platform member 14 to extend over the edge 22 of the pool or body of water 24 when the portion 52 of an edge 50 of the base member 12 is positioned proximate to or in-line with the edge 22 of the pool or body of water 24.

The base member 12 includes a securing member or support post 70 which extends to the platform member 14 to properly support the platform member 14 in the raised position. The support post 70 provides sufficient support to stabilize the platform member 14 and support one or more lifeguards positioned thereon. The support post 70 can be made from any material having the strength characteristics required to stabilize the platform member 14 and the lifeguard observation station 10.

The base member 12 includes a brake/ballast assembly or assembly 69. The brake/ballast mechanism or assembly 69 includes a fixed member or plate 71, a movable brake/ballast plate 80 and an engagement member 89.

Figure 2:
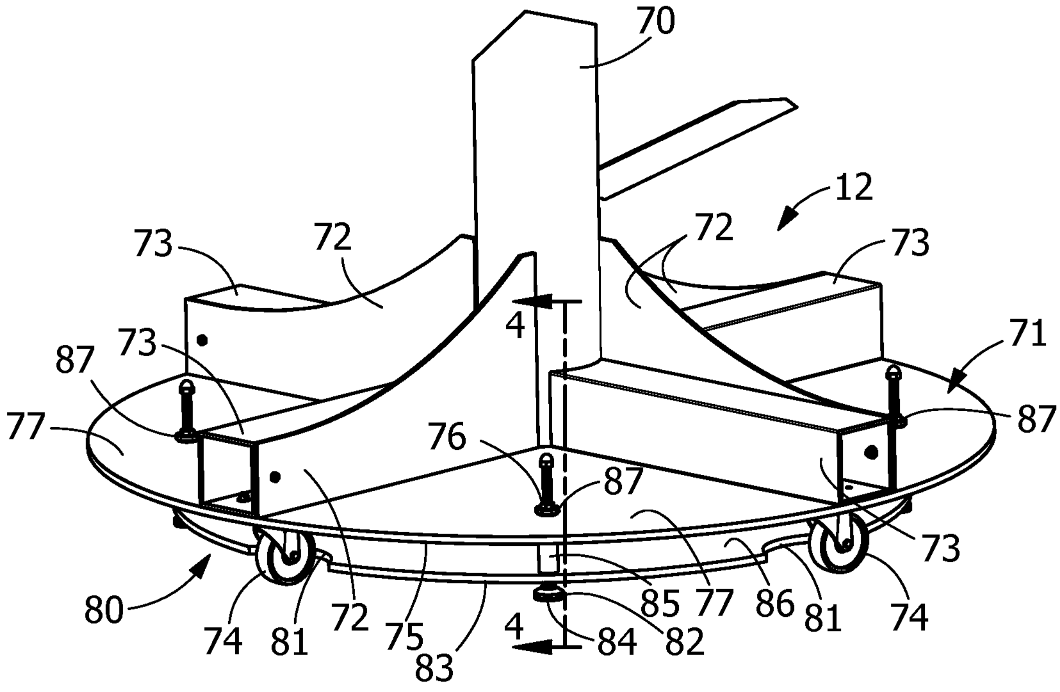
FIG. 2 is a perspective view of a base of the lifeguard observation station of FIG. 1 with the guard removed, showing a fixed member and a movable brake/ballast plate, the movable plate being shown in a second position in which the brake/ballast plate prevents the movement of the lifeguard observation station relative to a deck or surface.
Figure 5:
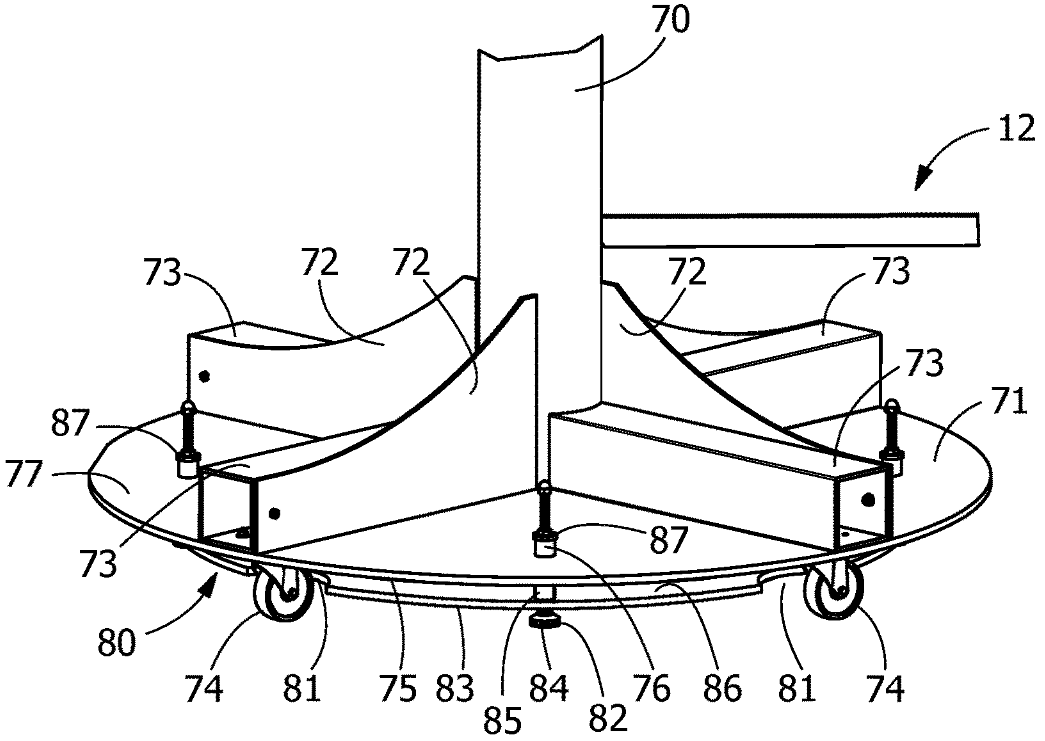
FIG. 5 is a perspective view of the base of the lifeguard observation of the lifeguard observation station of FIG. 1, showing the fixed member and the movable brake/ballast plate, the movable brake/ballast plate being shown in a first position in which the brake/ballast plate is moved closer to the fixed member to allow the movement of the lifeguard observation station relative to the deck or surface.
Figure 7:
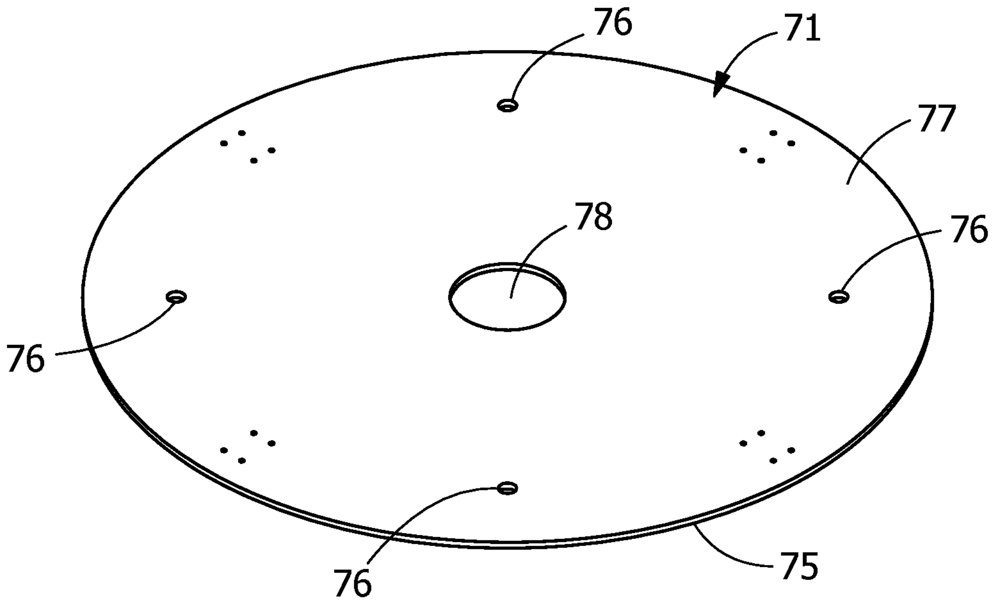
FIG. 7 is a top perspective view of the fixed member of the base.

A horizontally oriented fixed plate 71 is attached to the end of the support post 70 which is removed from the platform member 14. As shown in FIGS. 2, 5 and 7, the fixed plate 71 is a disc shaped member. However, other configurations of the fixed plate 71 may be used. The base member 12 and the fixed plate 71 have a smaller surface area than the surface area of the platform member 14. The fixed plate 71 is configured to include sufficient material to provide sufficient weight to allow the fixed plate 71 to act as a ballast for the platform member 14 and the lifeguard observation station 10. The fixed plate 71 and the base member 12 are configured to properly support and provide stability to the platform member 14 and stairs 16, thereby allowing the lifeguard to move about the platform member 14 and the stairs 16 without causing the platform to tip or become unstable.

Reinforcing members 72 extend radially from the support post 70 to provide sufficient support to the base 12 and the lifeguard observation station 10. Strengthening members 73 are attached to the reinforcing members 72. The strengthening members 73 also extend radially from the support post 70. The strengthening members 73 may be attached to the support post 70 and the reinforcing members 72 by welding, mounting hardware (not shown) or by other known methods of attachment. In the illustrative embodiment, the strengthening members 73 are square tubular members, but other configurations may be used. The strengthening members 73 are also attached to the fixed plate 71 by welding, mounting hardware (not shown) or by other known methods of attachment. The reinforcing members 72 and strengthening members 73 can be made from any material having the strength characteristics required. In the illustrative embodiment shown, four reinforcing members 72 and strengthening members 73 are provided. However, other numbers of reinforcing members 42 and other configurations of the support post receiving member 40 and reinforcing members 42 can be used without departing from the scope of the invention.

Wheels 74 are mounted on a bottom surface 75 of the fixed plate 71. The wheels 74 are positioned to be in line with the strengthening members 73 to provide proper support to the wheels 74. In the embodiment shown, four wheels 74 are provided to give proper stability to the lifeguard observation station 10 as it is moved on a surface or deck 23 (FIG. 1).

Projection member receiving openings 76 are provided in the fixed plate 71. The projection member receiving openings 76 extend from the bottom surface 75 to a top surface 77 of the fixed plate 71. In the embodiment shown, the projection member receiving openings 76 have a circular cross-section and are spaced from the wheels 74. Four projection member receiving openings 76 are provided. However, other configurations, numbers and spacing of the projection member receiving openings 76 may be provided.

As shown in FIG. 7, an engagement member receiving opening 78 is provided in the center of the fixed plate 71. The engagement member receiving opening 78 extends from the bottom surface 75 to the top surface 77. The engagement member receiving opening 78 is positioned to be in line with the support post 70.

Figure 3:
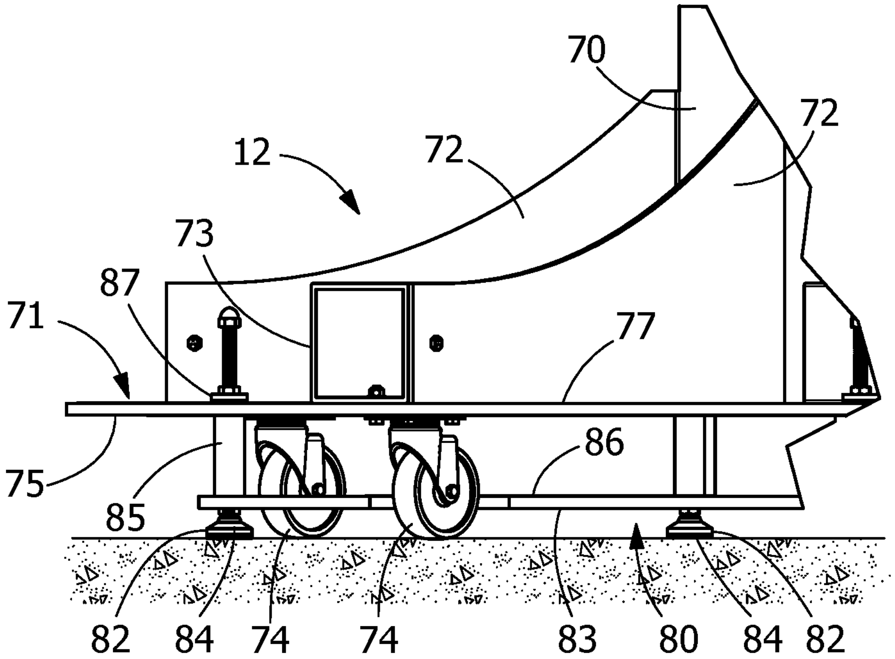
FIG. 3 is an enlarged partial front perspective view of an area of FIG. 2.
Figure 6:
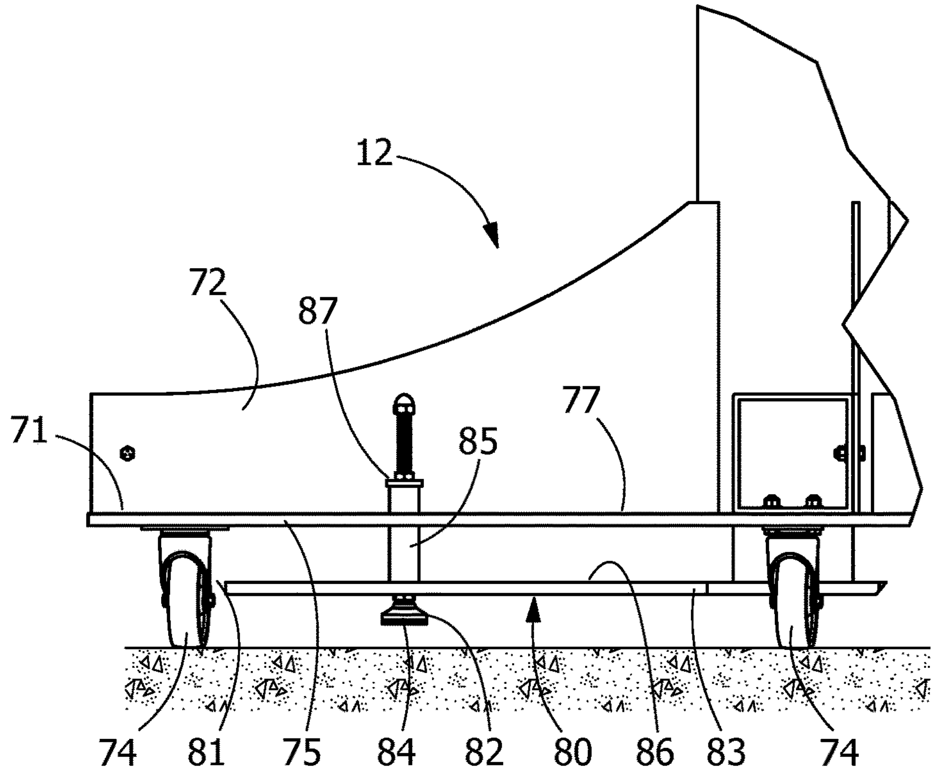
FIG. 6 is an enlarged partial front perspective of an area of FIG. 5.

The base member 12 includes a movable brake/ballast plate 80. The movable brake/ballast plate 80 is movable between a movable brake/ballast plate first position, as shown in FIGS. 5 and 6, and a movable brake/ballast plate second position, as shown in FIGS. 2 and 3. In the movable brake/ballast plate first position, the movable brake/ballast plate 80 is positioned proximate the fixed plate 71. In the movable brake/ballast plate second position, the movable brake/ballast plate 80 is spaced from the fixed plate 71.

Figure 8:
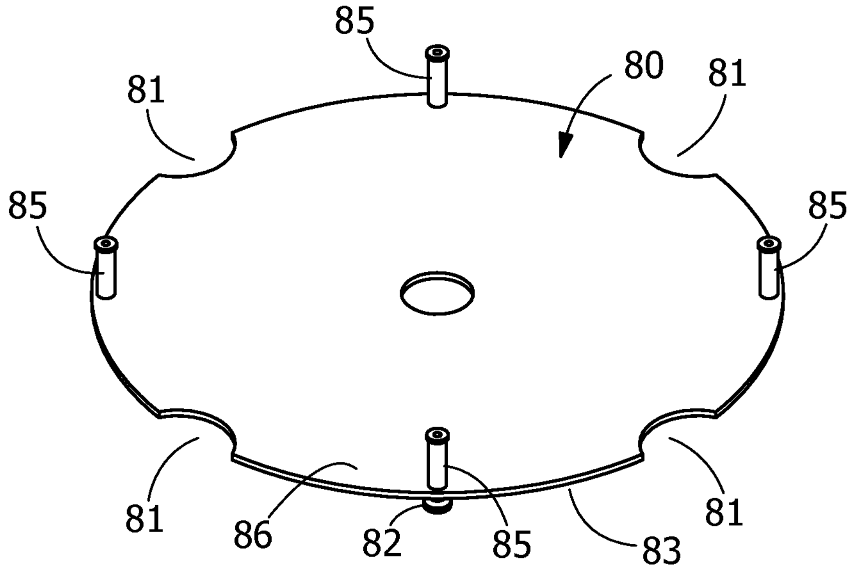
FIG. 8 is a top perspective view of the movable brake/ballast plate of the base.

As shown in FIGS. 3 and 6, the movable brake/ballast plate 80 extends in a plane which is essentially parallel to a plane of the fixed plate 71. As shown in FIG. 8, the movable brake/ballast plate 80 is a disc shaped member with wheel receiving cutouts or openings 81 spaced about the circumference of the movable brake/ballast plate 80. However, other configurations of the movable brake/ballast plate 80 may be used. The movable brake/ballast plate 80 is dimensioned to include sufficient material to provide sufficient weight to allow the brake/ballast plate 80 to act as ballast for the platform member 14 and the lifeguard observation station 10, as will be more fully described below. For example, the brake/ballast plate 80 may have a weight of less than 300 pounds, greater than 50 pounds, between 50 pounds and 300 pounds, or any other weight which provide sufficient ballast to the brake/ballast mechanism or assembly 69. The movable brake/ballast plate 80 may be made from metal or other materials having the required characteristics.

Braking members or projections 82 extend from a bottom surface 83 of the movable brake/ballast plate 80 in a direction away from the fixed plate 71. In the embodiment shown, the braking projections 82 have bottom surfaces 84 which engage the deck or surface 23 when the movable brake/ballast plate 80 is positioned in the movable brake/ballast plate second position. The surface area of the bottom surfaces 84 is sufficient to provide adequate force and resistance to prevent the movement of the braking projections 82 relative to the deck or surface 23 when the movable brake/ballast plate 80 is positioned in the movable brake/ballast plate second position, which in turn, prevents the movement of the lifeguard observation station 10 relative to the deck or surface 23. Four braking projections 82 are provided, however, other numbers of braking projections 82 may be provided without departing from the scope of the invention. In various embodiments, the braking projections 82 may be adjustable to allow the bottom surfaces 84 to properly contact the deck or surface 23. In other embodiments, the braking members may have other configurations other than braking projections. For example, the braking members may be portions of the movable brake/ballast plate 80.

Positioning projections 85 are provided on the movable brake/ballast plate 80. The positioning projections 85 extend from a top surface 86 of the movable brake/ballast plate 80 in a direction away from the bottom surface 83. The illustrative positioning projections 85 have cylindrical configurations. In the illustrative embodiment shown, four positioning projections 85 are in line and extend from the braking projections 82, however, the number and position of the positioning projections 85 may vary. As shown in FIGS. 2 and 5, the positioning projections 85 are provided in line with and extend through the projection member receiving openings 76 of the fixed plate 71.

The positioning projections 85 have shoulders 87 which extend from side surfaces 88 of the positioning projections 85. The shoulders 87 extend about the circumference of the positioning projections 85. The shoulders 87 are spaced from the top surface 77 of the fixed plate 71 when the movable brake/ballast plate 80 is positioned in the movable brake/ballast plate first position, as shown in FIGS. 5 and 6. The shoulders 87 are in engagement with the top surface 77 of the fixed plate 71 when the movable brake/ballast plate 80 is positioned in the movable brake/ballast plate second position, as shown in FIGS. 2 and 3.

Figure 4:
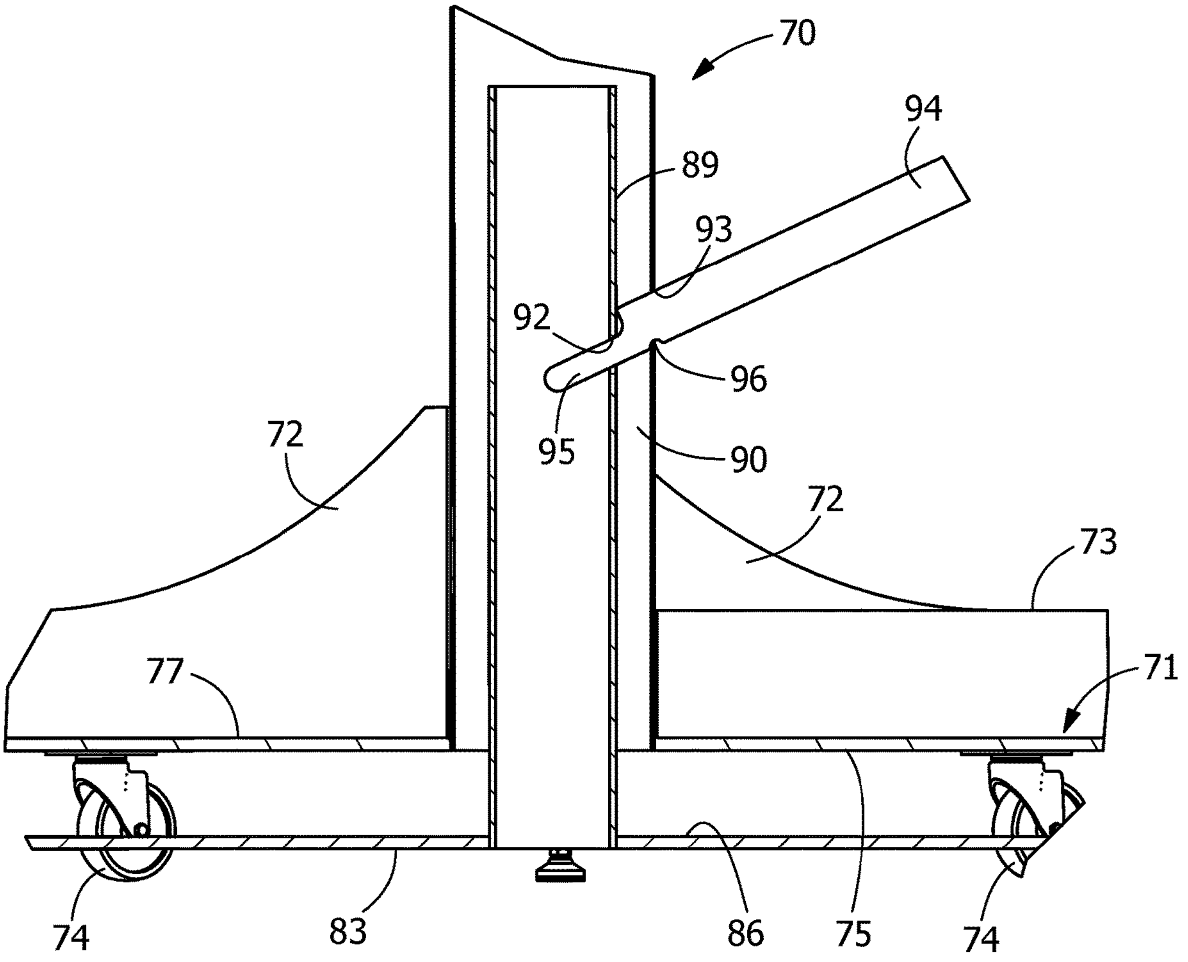
FIG. 4 is a cross-sectional view taken along line 4-4 of FIG. 2.

An engagement member 89, as shown in FIG. 4, is mechanically connected to the center of the movable brake/ballast plate 80. The engagement member 89 may be attached to the movable brake/ballast plate 80 by welding, mounting hardware (not shown) or by other known methods of attachment. In various illustrative embodiments, a mounting plate (not shown) may be attached to the end of the engagement member 89. The mounting plate is also attached to the bottom surface 83 of the movable brake/ballast plate 80.

The engagement member 89 is a cylindrical member or post which extends through the engagement member receiving opening 78 of the fixed plate 71 and into an interior opening 90 of the support post 70. The engagement member 89 is configured to have a smaller cross-section than the engagement member receiving opening 78 and the interior opening 90, thereby allowing the engagement member 89 to be movable relative to the engagement member receiving opening 78 and the interior opening 90 between an engagement member first position and an engagement member second position.

Figure 9:
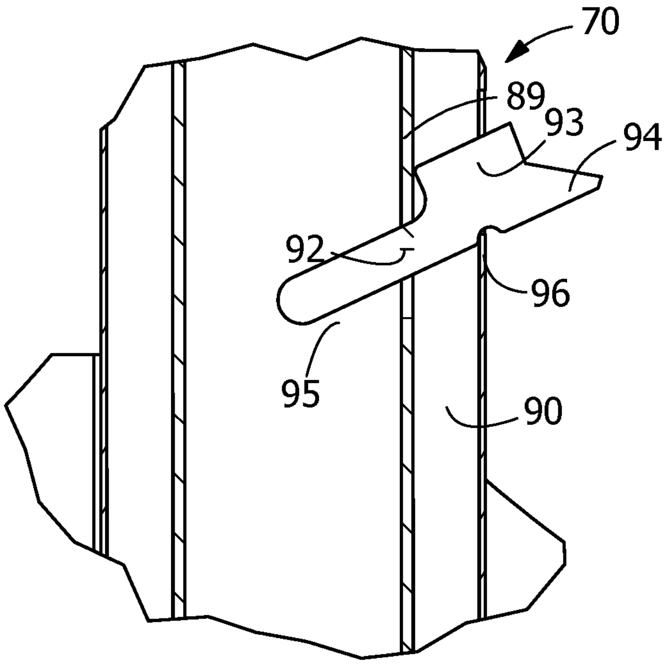
FIG. 9 is a cross-sectional view taken along line 9-9 of FIG. 1, showing an activation member in a second position.
Figure 11:
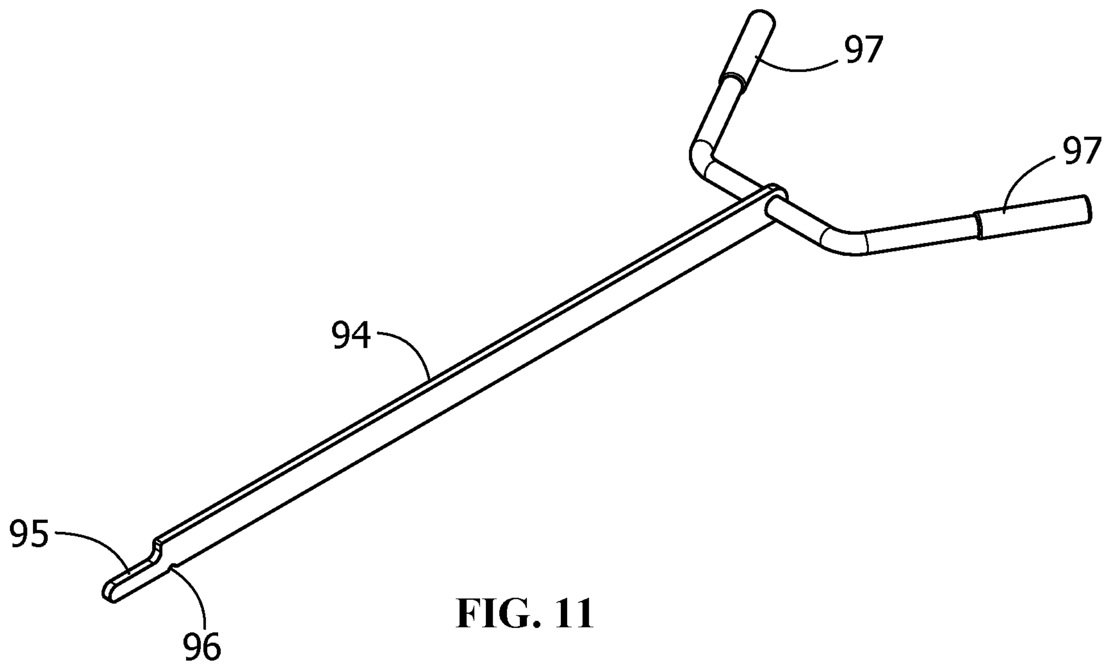
FIG. 11 is a perspective view of a handle of the lifeguard observation station.

As shown in FIG. 9, the engagement member 89 has an activation member or handle receiving opening 92 which is positioned in alignment with an activation member or handle receiving opening 93 of the support post 70. An activation member or handle 94 extends through the activation member or handle receiving opening 93 and into the activation member or handle receiving opening 92. As shown in FIG. 11, an activation member or handle 94 has a free end 95 which engages the engagement member 89. The activation member or handle 94 has a pivoting notch or recess 96 provided proximate the free end 95. The pivoting notch or recess 96 engages the post 70 when the activation member or handle 94 is properly positioned in the post 70. User engagement grips 97 are provided at the opposite end of the activation member or handle 94 from the free end 95. As the activation member 94 is moved between an activation member first position and an activation member second position, the activation member 94 is moved or pivoted about the pivoting notch or recess 96 and the free end 94 is moved up and down, causing the engagement member 89 to be moved between the engagement member first position and the engagement member second position.

The stairs 16 extend from the platform member 14 to the deck or surface 23 of the pool 24. The stairs 16 have a generally spiral configuration. The stairs 16 may be supported by support members 60. The support members 60 may be attached to the stairs 16 and the support post 70 and/or the base 12 to provide proper positioning and stability to the stairs 16. The stairs 16 may be of different height depending upon the overall height of the observation station 10.

A bottom step **16*a* of the stairs 16 is positioned such that a longitudinal axis or a longitudinal edge of the bottom step 16*a* is essentially parallel to the edge 22 of the pool or body of water 24 at which the lifeguard observation station member is positioned. As shown in FIG. 1, the bottom step 16*a* is positioned is spaced from the edge 22 of the pool 24, thereby allowing the lifeguard to step on the deck or surface 23 of the pool 24 prior to entering the pool 24. In other embodiments, the bottom step 16*a* is positioned proximate to or in-line with the edge 22 of the pool 24, thereby allowing the lifeguard to enter the pool 24 directly from the bottom step 16*a***.

As shown in FIG. 1, when viewed from the edge 22 of the pool or body of water 24, the stairs 16 are offset from the support post 70 to allow a lifeguard using the stairs to have unobstructed line-of-sight of the pool or body of water 24 as the lifeguard descends the stairs 16 from the platform member 14.

Figure 10:
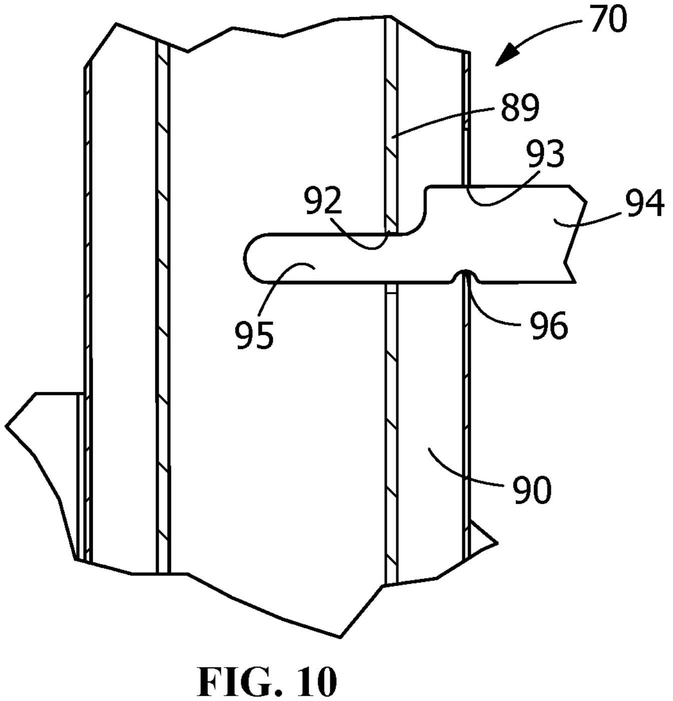
FIG. 10 is a cross-sectional view similar to FIG. 9, showing the activation member in a first position.

In use, when it is desired to move the lifeguard observation station 10 or other movable structure, the activation member 94 is positioned through the activation member or handle receiving opening 93 and into the activation member or handle receiving opening 92. Once properly positioned, the activation member 94 is moved, by an operator, from the activation member second position to the activation member first position. As this occurs the engagement member 89 is moved from the engagement member second position, as shown in FIG. 9, to the engagement member first position, as shown in FIG. 10.

With the engagement member 89 moved to the engagement member first position, the movable brake/ballast plate 80 is moved to the movable brake/ballast plate first position, where the movable brake/ballast plate 80 is positioned proximate the fixed plate 71. In the movable brake/ballast plate first position, the bottom surfaces 84 of the braking projections 82 do not engage and are spaced from the deck or surface 23. In this position, the wheel receiving cutouts or openings 81 of the movable brake/ballast plate 80 allow the movable brake/ballast plate 80 to move past the wheels 74. This allows the wheels 74 to remain in contact with the deck or surface 23. In this position, the activation member or handle 94 is used to move, steer and position the lifeguard observation station 10 or other movable structure to the desired location. As the occurs, the operator must apply pressure to the user engagement grips 97 of the activation member 94 to retain the activation member 94 in the activation member first position. As the operator must engage the user engagement grips 97 of the activation member 94, the operator also controls the movement of the lifeguard observation station 10 or other movable structure through the engagement with the activation member 89.

In the movable brake/ballast plate first position, the shoulders 87 of the positioning projections 85 are spaced from the top surface 77 of the fixed plate. In this position, the movable brake/ballast plate 80 and the fixed plate 71 act as independent members.

When the movement of the lifeguard observation station 10 or other movable structure is to be stopped, the operator moves the activation member 94 from the activation member first position to the activation member second position. As this occurs the engagement member 89 is moved from the engagement member first position, as shown in FIG. 10, to the engagement member second position, as shown in FIG. 9.

With the engagement member 89 moved to the engagement member second position, the movable brake/ballast plate 80 is moved to the movable brake/ballast plate second position, where the movable brake/ballast plate 80 is moved away from or is spaced from the fixed plate 71. In the movable brake/ballast plate second position, the bottom surfaces 84 of the braking projections 82 are moved into engagement with the deck or surface 23. The wheel receiving cutouts or openings 81 of the movable brake/ballast plate 80 allow the movable brake/ballast plate 80 to move past the wheels 74 without damaging the wheels 74. With the bottom surfaces 84 in engagement with the deck or surface 23, the surface area of the bottom surfaces 84 is sufficient to provide adequate force and resistance to prevent the movement of the braking projections 82 relative to the deck or surface 23, which in turn, prevents the movement of the lifeguard observation station 10 relative to the deck or surface 23. In this position, the lifeguard observation station 10 or other movable structure is not movable.

In the movable brake/ballast plate second position, the shoulders 87 of the positioning projections 85 are in engagement with the top surface 77 of the fixed plate 71. In this position, the positioning projections 85 cooperate with the fixed plate 71, to prevent the movement of the movable brake/ballast plate 80 relative to the fixed plate 71, allowing the movable brake/ballast plate 80 to provide additional weight and ballast to the fixed plate 71, the base 12 and the lifeguard observation station 10. The cooperation of the movable brake/ballast plate 80 with the fixed plate 71 provides additional stability to the lifeguard observation station 10 or other movable structure when the movable brake/ballast plate 80 is in the movable brake/ballast plate second position and the lifeguard observation station 10 or other movable structure is prevented from moving relative to the deck or surface 23.

Due to the configuration of the brake/ballast assembly 69 and its components, when the handle 94 is released, the handle 94 is automatically returned to the second position, which in turn lowers the movable brake/ballast plate 80 to provide automatic braking of the brake/ballast assembly 69. This provides a failsafe method of braking and securing the brake/ballast assembly 69 and movable structure, preventing the unwanted movement of the brake/ballast assembly 69 and movable structure.

Figure 12:
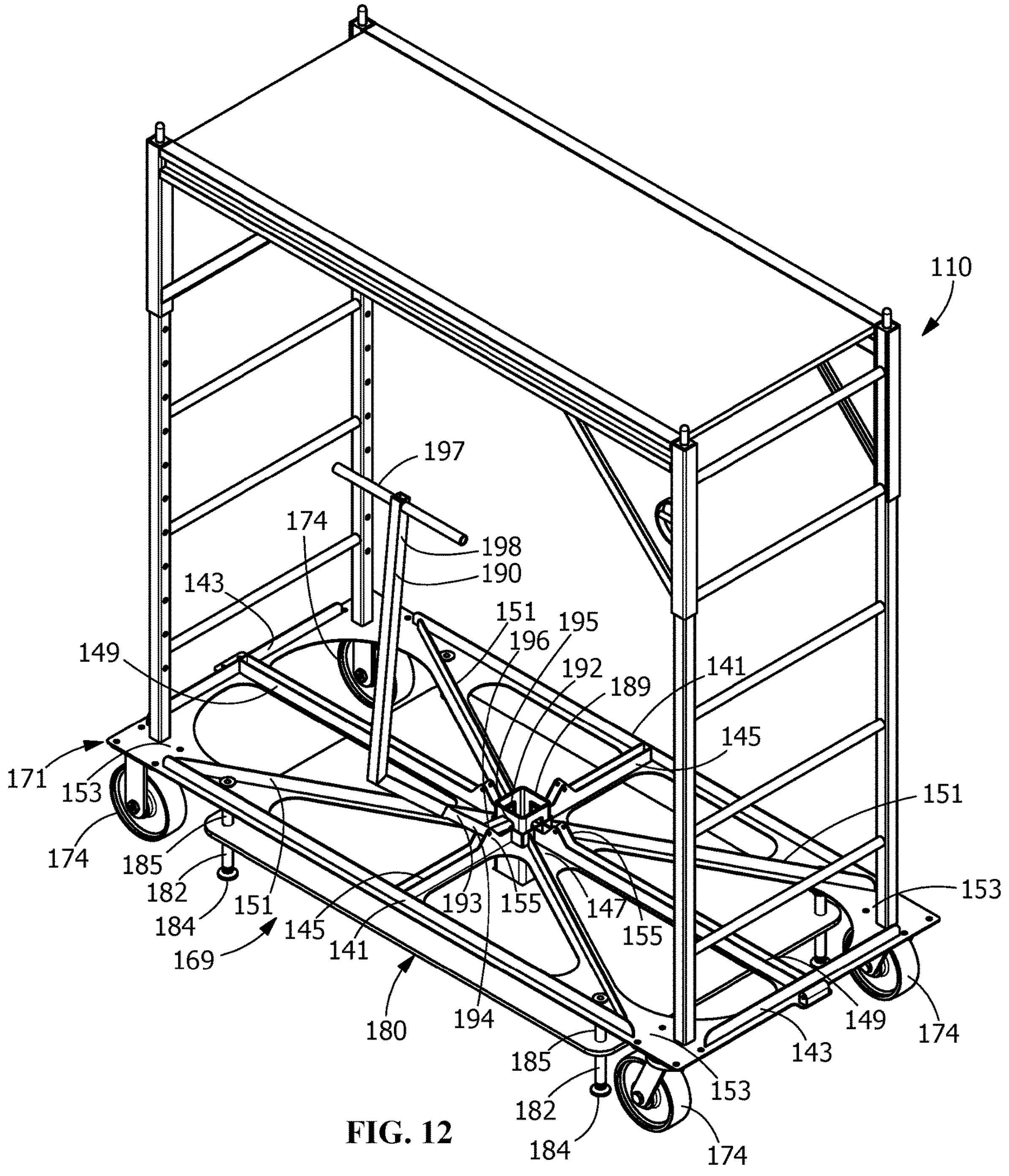
FIG. 12 is a front perspective view of an illustrative embodiment of a scaffold using a brake/ballast assembly of the present invention.

As shown in FIG. 12, an alternate illustrative embodiment of a brake/ballast assembly 169 is shown. The brake/ballast assembly 169 is modular in nature and can be scaled according to the size of the structural member which is to be positioned on the brake/ballast assembly 169. In this embodiment the brake/ballast assembly 169 is used with a scaffold 110. However, the structural or movable member may be other types of members, such as, but not limited to, lifts, stands, and mobile stairs, without departing from the scope of the invention. As shown in FIGS. 12 through 21, the brake/ballast assembly 169 includes a fixed member 171, a movable brake/ballast plate 180 and an engagement member 189.

Figure 13:
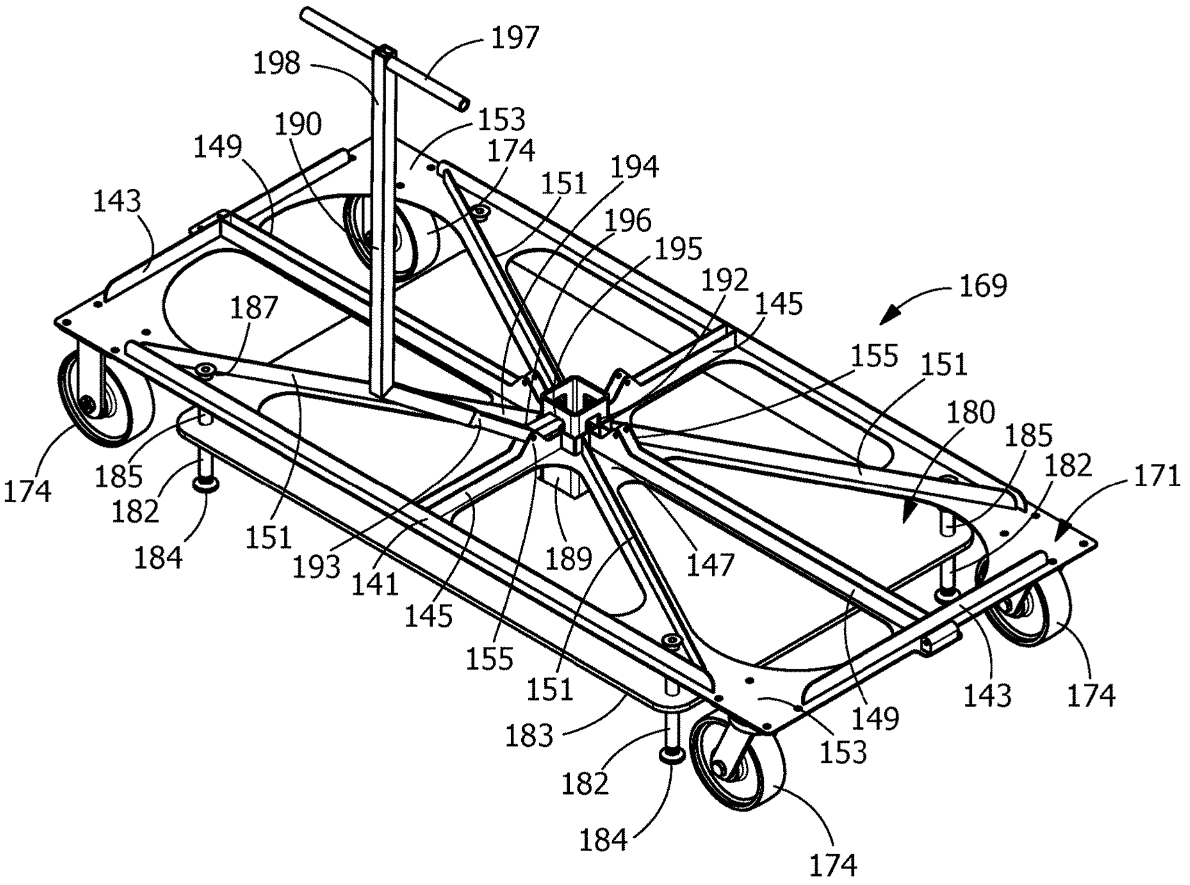
FIG. 13 is a perspective view of the brake/ballast assembly of FIG. 12, showing a fixed member and a movable brake/ballast plate, the movable plate being shown in a second position in which the brake/ballast plate prevents the movement of the scaffold relative to a deck or surface, the handle is shown in an engaged position.
Figure 16:
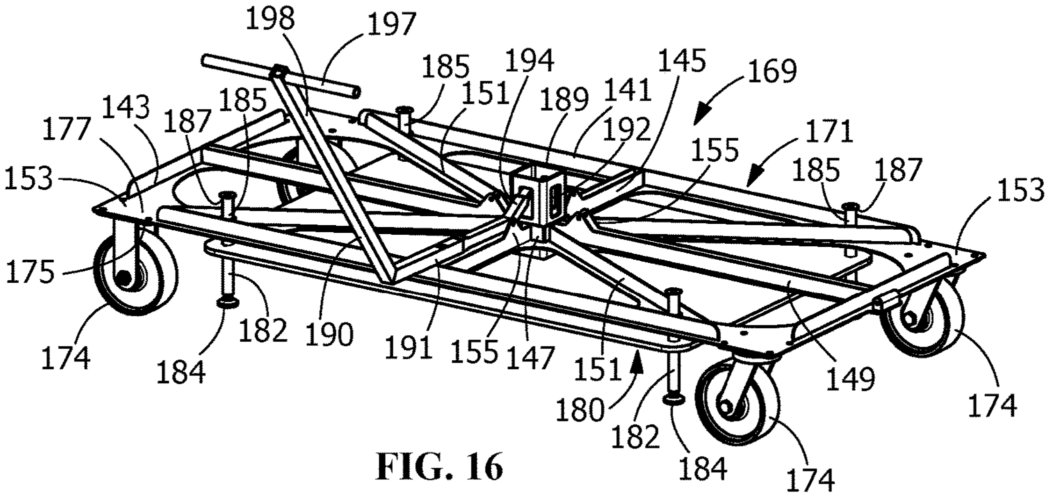
FIG. 16 is a perspective view of the brake/ballast assembly of FIG. 12, showing a fixed member and a movable brake/ballast plate, the movable brake/ballast plate being shown in a first position in which the brake/ballast plate is moved closer to the fixed member to allow the movement of scaffold relative to the deck or surface, the handle is shown in a disengaged position.
Figure 18:
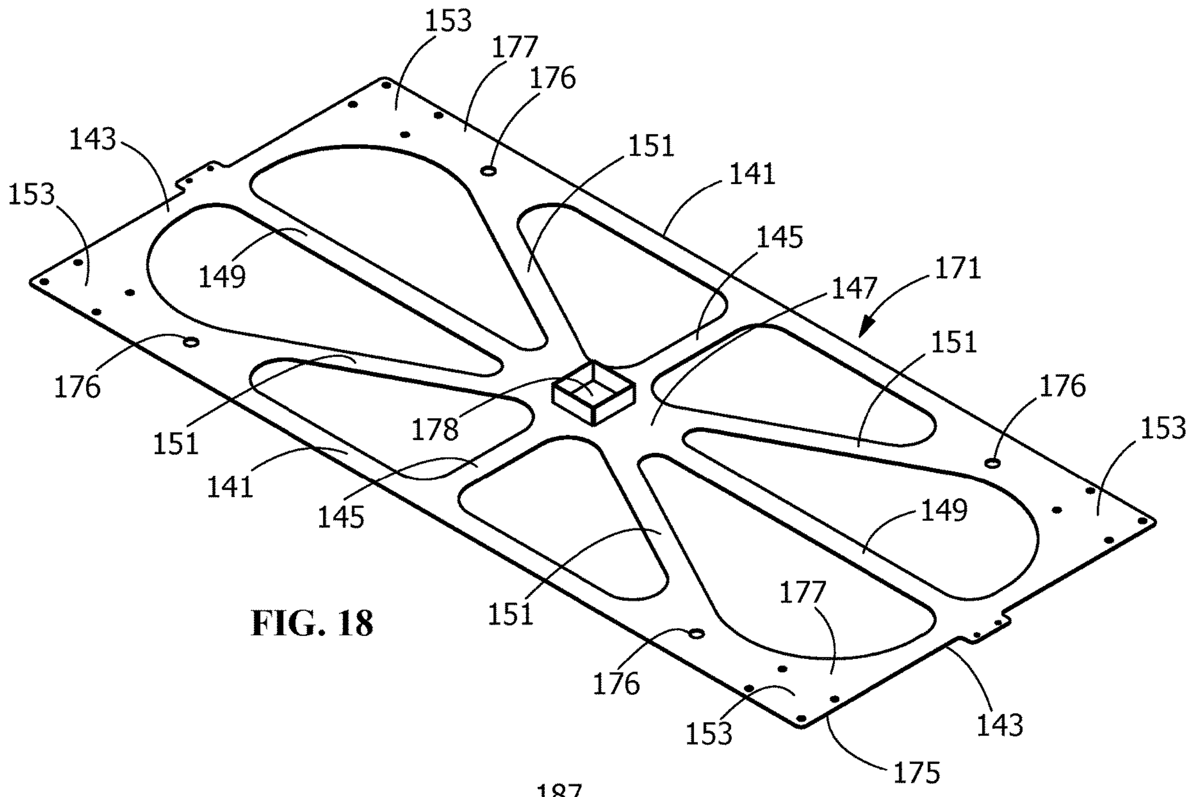
FIG. 18 is a top perspective view of the fixed member of the brake/ballast assembly.

The fixed member 171 has an approximately horizontal orientation. As shown in FIGS. 13, 16 and 18, the fixed member 171 is a rectangular shaped member. The fixed member 171 side members 141 and end members 143 which form a rectangular frame. First reinforcement and strengthening members 145 extend from the side members 141 to a center member 147. The first reinforcement and strengthening members 145 extend approximately perpendicular to the side members 141. Second reinforcement and strengthening members 149 extend from the end members 143 to the center member 147. The second reinforcement and strengthening members 149 extend approximately perpendicular to the end members 143. Third reinforcement and strengthening members 151 extend from the side members 141 proximate the end members 143 to the center member 147. The third reinforcement and strengthening members 151 extend at approximately 45 degrees to the side members 141.

In the illustrative embodiment, the first reinforcement and strengthening members 145, second reinforcement and strengthening members 147 are square tubular members, but other configurations may be used. The first reinforcement and strengthening members 145, second reinforcement and strengthening members 147 and third reinforcement and strengthening members 151 can be made from any material having the strength characteristics required. In the illustrative embodiment shown, two first reinforcement and strengthening members 145, two second reinforcement and strengthening members 147 and four third reinforcement and strengthening members 151 are provided. However, other numbers and other configurations of the first reinforcement and strengthening members 145, second reinforcement and strengthening members 147 and third reinforcement and strengthening members 151 can be used without departing from the scope of the invention.

Planar support members 153 are provide at the corners where the side members 141 join the end members 143. The planar support members 153 cooperate and provide support for the scaffold 110 or other structural members which are positioned on the brake/ballast assembly 169. The scaffold 110 or other structural members may be secured to the planar support members 153 or other parts of the brake/ballast assembly 169 using known methods, such as, but not limited, to welding or mounting hardware (not shown).

In various illustrative embodiments, the fixed member 171 is configured to include sufficient material to provide additional weight to allow the fixed member 171 to act as an additional ballast for the brake/ballast assembly 169 and the scaffold 110. The fixed member 171 is configured to properly support and provide stability to the scaffold 110, thereby allowing the workers or other users of the scaffold 110 to move about the scaffold 110 without causing the scaffold 110 to tip or become unstable.

Wheels 174 are mounted on a bottom surface 175 of the planar support members 153 of the fixed member 171. In the embodiment shown, four wheels 174 are provided to give proper stability to the brake/ballast assembly 169 and the scaffold 110 as it is moved on a surface 123 (FIG. 12).

As shown in FIG. 18, projection member receiving openings 176 are provided in the fixed member 171. The projection member receiving openings 176 extend from the bottom surface 175 to a top surface 177 of the planar support members 153 of the fixed member 171. In the embodiment shown, the projection member receiving openings 176 have a circular cross-section and are spaced from the wheels 174. Four projection member receiving openings 176 are provided. However, other configurations, numbers and spacing of the projection member receiving openings 176 may be provided. As shown in FIG. 18, an engagement member receiving opening 178 is provided in the center of the fixed member 171.

Figure 14:
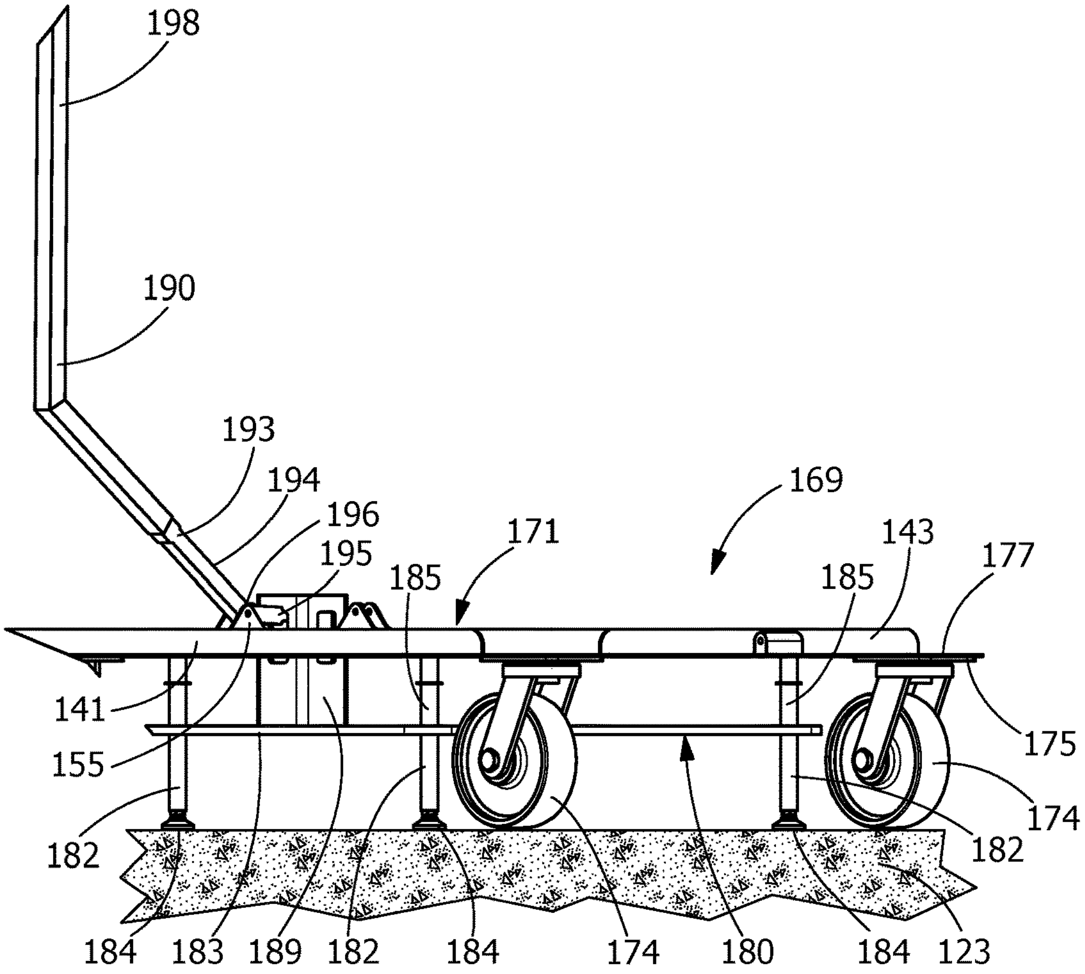
FIG. 14 is an enlarged partial front perspective of an area of FIG. 13.
Figure 17:
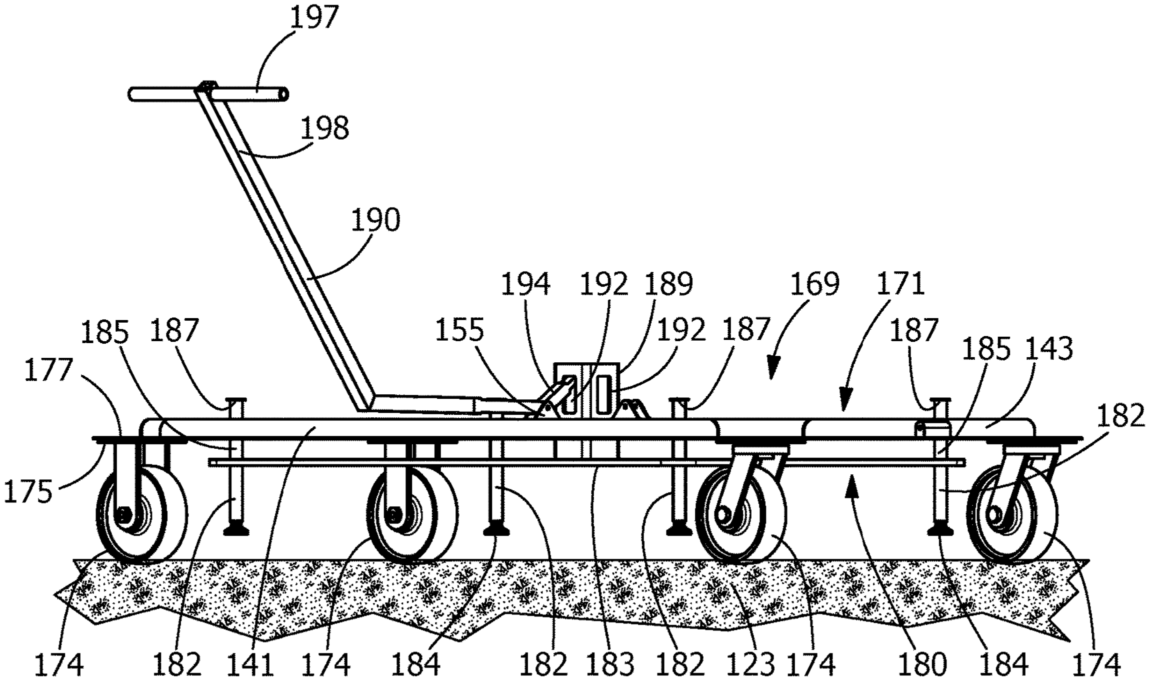
FIG. 17 is an enlarged partial front perspective of an area of FIG. 16.

The movable brake/ballast plate 180 is movable between a movable brake/ballast plate first position, as shown in FIGS. 16 and 17, and a movable brake/ballast plate second position, as shown in FIGS. 13 and 14. In the movable brake/ballast plate first position, the movable brake/ballast plate 180 is positioned proximate the fixed member 171. In the movable brake/ballast plate second position, the movable brake/ballast plate 180 is spaced from the fixed member 171.

Figure 19:
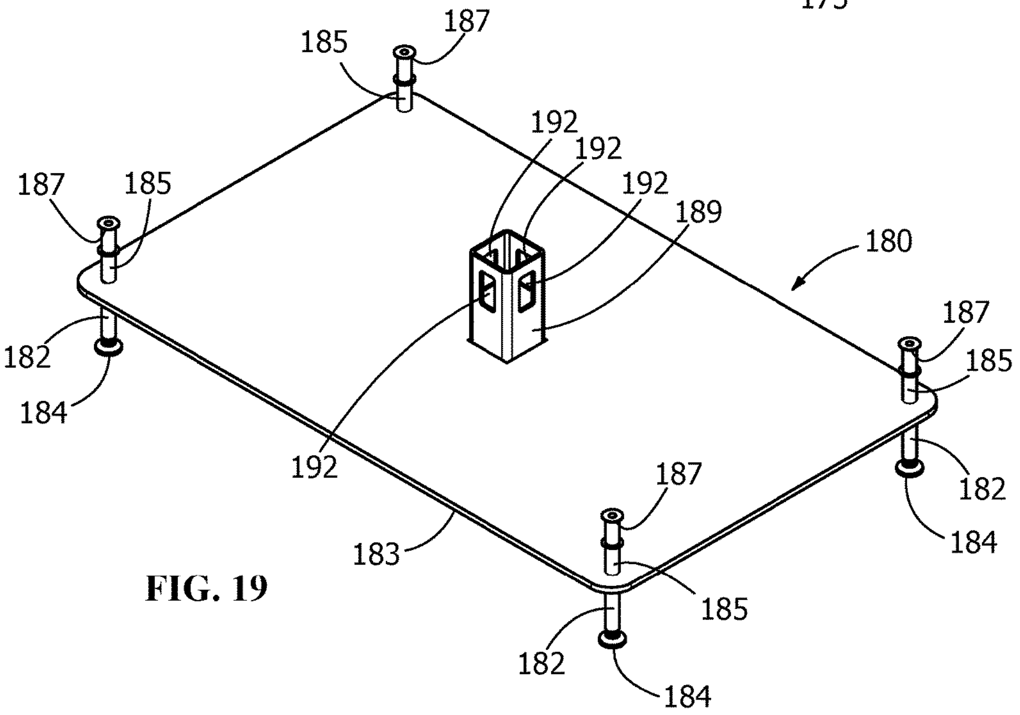
FIG. 19 is a top perspective view of the movable brake/ballast plate of the brake/ballast assembly.

As shown in FIGS. 14 and 17, the movable brake/ballast plate 180 extends in a plane which is essentially parallel to a plane of the fixed member 171. As shown in FIG. 19, the movable brake/ballast plate 180 is a rectangular shaped member. However, other configurations of the movable brake/ballast plate 180 may be used. The movable brake/ballast plate 180 is dimensioned to include sufficient material to provide sufficient weight to allow the movable brake/ballast plate 180 to act as ballast for the brake/ballast assembly 169 and the scaffold 110, as will be more fully described below. For example, the brake/ballast plate 180 may have a weight of less than 300 pounds, greater than 50 pounds, between 50 pounds and 300 pounds, or any other weight which provide sufficient ballast to the brake/ballast assembly 169. The movable brake/ballast plate 180 may be made from metal or other materials having the required characteristics.

Braking members or projections 182 extend from a bottom surface 183 of the movable brake/ballast plate 180 in a direction away from the fixed member 171. In the embodiment shown, the braking projections 182 have bottom surfaces 184 which engage the surface 123 when the movable brake/ballast plate 180 is positioned in the movable brake/ballast plate second position. The surface area of the bottom surfaces 184 is sufficient to provide adequate force and resistance to prevent the movement of the braking projections 182 relative to the surface 123 when the movable brake/ballast plate 180 is positioned in the movable brake/ballast plate second position, which in turn, prevents the movement of the brake/ballast plate 180 and the scaffold 110 relative to the surface 123. Four braking projections 182 are provided, however, other numbers of braking projections 182 may be provided without departing from the scope of the invention. In various embodiments, the braking projections 182 may be adjustable to allow the bottom surfaces 184 to properly contact the surface 123. In other embodiments, the braking members may have other configurations other than braking projections. For example, the braking members may be portions of the movable brake/ballast plate 180.

Positioning projections 185 are provided on the movable brake/ballast plate 180. The positioning projections 185 extend from a top surface 186 of the movable brake/ballast plate 180 in a direction away from the bottom surface 183. The illustrative positioning projections 185 have cylindrical configurations. In the illustrative embodiment shown, four positioning projections 185 are in line and extend from the braking projections 182, however, the number and position of the positioning projections 185 may vary. As shown in FIGS. 13 and 16, the positioning projections 185 are provided in line with and extend through the projection member receiving openings 176 of the fixed member 171.

The positioning projections 185 have shoulders 187 which extend from side surfaces 188 of the positioning projections 185. The shoulders 187 extend about the circumference of the positioning projections 185. The shoulders 187 are spaced from the top surface 177 of the fixed member 171 when the movable brake/ballast plate 180 is positioned in the movable brake/ballast plate first position, as shown in FIGS. 16 and 17. The shoulders 187 are in engagement with the top surface 177 of the fixed member 171 when the movable brake/ballast plate 180 is positioned in the movable brake/ballast plate second position, as shown in FIGS. 13 and 14.

Figure 15:
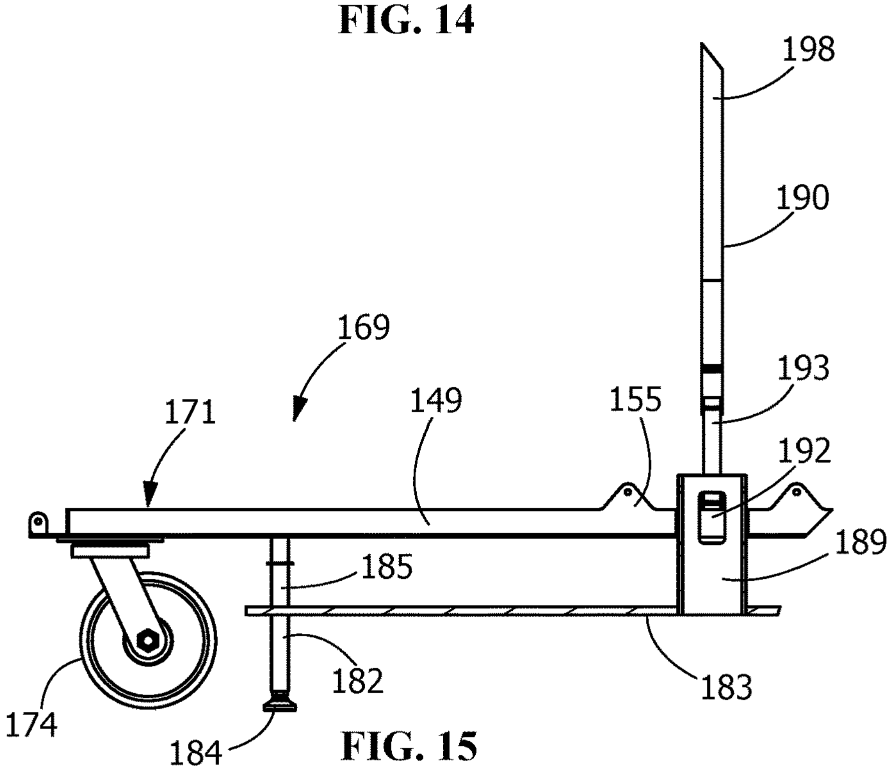
FIG. 15 is a cross-sectional view taken along line 15-15 of FIG. 13.

An engagement member 189, as shown in FIG. 15, is mechanically connected to the center of the movable brake/ballast plate 180. The engagement member 189 may be attached to the movable brake/ballast plate 180 by welding, mounting hardware (not shown) or by other known methods of attachment. In various illustrative embodiments, a mounting plate (not shown) may be attached to the end of the engagement member 189. The mounting plate is also attached to the bottom surface 183 of the movable brake/ballast plate 180.

The engagement member 189 is a square tubular member which extends through the engagement member receiving opening 178 of the fixed member 171. The engagement member 189 is configured to have a smaller cross-section than the engagement member receiving opening 178, thereby allowing the engagement member 189 to be movable relative to the engagement member receiving opening 178 between an engagement member first position and an engagement member second position.

As shown in FIG. 12, the engagement member 189 has one or more activation member receiving opening 192. The one or more activation member receiving opening 192 are positioned above the fixed member 171. In the embodiment shown, the one or more activation member receiving opening 192 are positioned on different sides of the engagement member 189 to allow the engagement member 189 to be accessed from different sides of the brake/ballast assembly 169.

One or more activation members 194 cooperate with the one or more activation member receiving opening 192. As shown in FIG. 14, the activation members 194 have first ends 195 which are positioned in the activation member receiving opening 192. Second ends 193 extend away from the engagement member 189. Pivoting portions 196 are provided between the first ends 195 and the second ends 193. The pivoting portions 196 are pivotally mounted to pivoting projections 155 of the first reinforcement and strengthening members 145 and/or the second reinforcement and strengthening members 147.

A handle 190 engages and cooperates with an activation member 194. The handle 190 has a first end 191 which is configured to cooperate with a second end 193 of an activation members 194. User engagement grips 197 are provided at the end 198 of the handle 190 which is opposed to the first end 191. As the handle 190 is moved between a handle first position and a handle second position, the handle 190 and the activation members 194 is moved or pivoted about the pivoting portions 196 and pivoting projections 155, allowing the end 198 of the handle 190 to be moved up and down, causing the first end 195 of the activation member 194 to move the engagement member 189 between the engagement member first position and the engagement member second position.

In use, when it is desired to move the brake/ballast assembly 169 and the scaffold 110 or other movable structure positioned on the brake/ballast assembly 169, the handle 190 is attached to the second end 193 of the activation members 194. Once properly positioned, the handle 190 is moved, by an operator, from the handle second position to the handle first position. As this occurs, the activation member 194 is pivoted causing the first end 195 of the activation member 194 to engage the engagement member 189 to move the engagement member 189 from the engagement member second position, as shown in FIG. 14, to the engagement member first position, as shown in FIG. 17.

With the engagement member 189 moved to the engagement member first position, the movable brake/ballast plate 180 is moved to the movable brake/ballast plate first position, where the movable brake/ballast plate 180 is positioned proximate the fixed member 171, as shown in FIGS. 16 and 17. In the movable brake/ballast plate first position, the bottom surfaces 184 of the braking projections 182 do not engage and are spaced from the surface 123. In this position, the handle 190 is used to move, steer and position the brake/ballast assembly 169 and the scaffold 110 or other movable structure to the desired location. As the occurs, the operator must apply pressure to the user engagement grips 197 of the handle 190 to retain the handle 190 in the activation member first position. As the operator must engage the user engagement grips 197 of the handle 190, the operator also controls the movement of the brake/ballast assembly 169 and the scaffold 110 or other movable structure.

In the movable brake/ballast plate first position, the shoulders 187 of the positioning projections 185 are spaced from the top surface 177 of the fixed plate. In this position, the movable brake/ballast plate 180 and the fixed plate 171 act as independent members.

When the movement of the brake/ballast assembly 169 and the scaffold 110 or other movable structure is to be stopped, the operator moves or releases the handle 190, allowing the handle 190 to move from the activation member first position to the activation member second position. As this occurs the engagement member 189 is moved from the engagement member first position, as shown in FIG. 17, to the engagement member second position, as shown in FIG. 14.

With the engagement member 189 moved to the engagement member second position, the movable brake/ballast plate 180 is moved to the movable brake/ballast plate second position, where the movable brake/ballast plate 180 is moved away from or is spaced from the fixed plate 171, as shown in FIGS. 13 and 14. In the movable brake/ballast plate second position, the bottom surfaces 184 of the braking projections 182 are moved into engagement with the surface 123. With the bottom surfaces 184 in engagement with the surface 123, the surface area of the bottom surfaces 184 is sufficient to provide adequate force and resistance to prevent the movement of the braking projections 182 relative to the surface 123, which in turn, prevents the movement of the brake/ballast assembly 169 and the scaffold 110 or other movable structure relative to the surface 123. In this position, the brake/ballast assembly 169 and the scaffold 110 or other movable structure is not movable.

In the movable brake/ballast plate second position, the shoulders 187 of the positioning projections 185 are in engagement with the top surface 177 of the fixed member 171. In this position, the positioning projections 185 cooperate with the fixed member 171, to prevent the movement of the movable braking plate 180 relative to the fixed member 171, allowing the movable brake/ballast plate 80 to provide additional weight and ballast to the fixed member 171, the brake/ballast assembly 169 and the scaffold 110 or other movable structure. The cooperation of the movable braking plate 180 with the fixed member 171 provides additional stability to the brake/ballast assembly 169 and the scaffold 110 or other movable structure when the movable braking plate 180 is in the movable brake/ballast plate second position and the brake/ballast assembly 169 and the scaffold 110 or other movable structure is prevented from moving relative to the surface 123.

Due to the configuration of the brake/ballast assembly 169 and its components, when the handle 190 is released, the handle 190 is automatically returned to the second position, which in turn lowers the movable brake/ballast plate 180 to provide automatic braking of the brake/ballast assembly 169. This provides a failsafe method of braking and securing the brake/ballast assembly 169 and movable structure, preventing the unwanted movement of the brake/ballast assembly 169 and movable structure.

Figure 20:
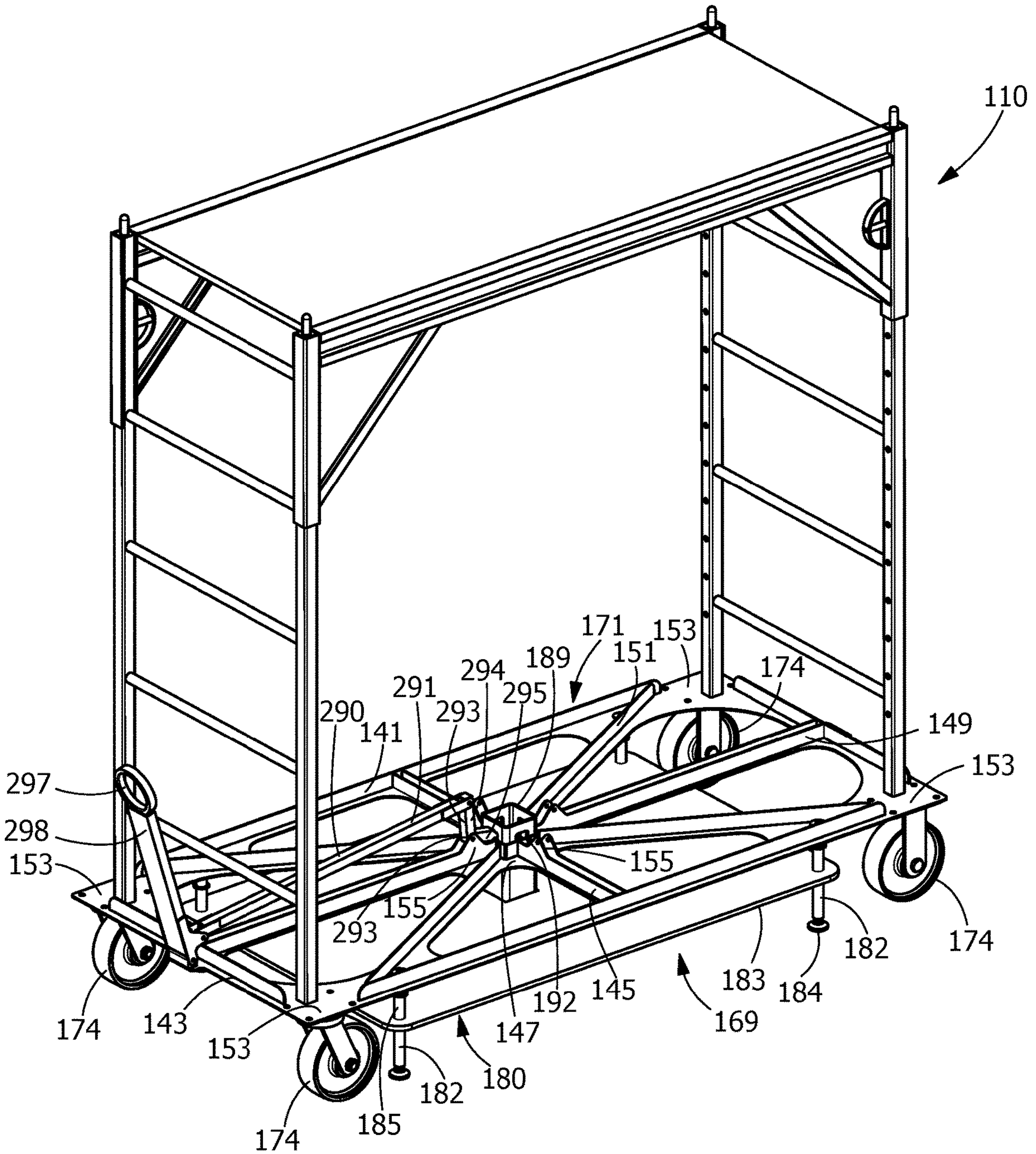
FIG. 20 is a perspective view of the brake/ballast assembly of FIG. 12, showing a fixed member and a movable brake/ballast plate, the movable plate being shown in a second position in which the brake/ballast plate prevents the movement of the scaffold to a deck or surface, the tow hitch is shown in an engaged position.
Figure 21:
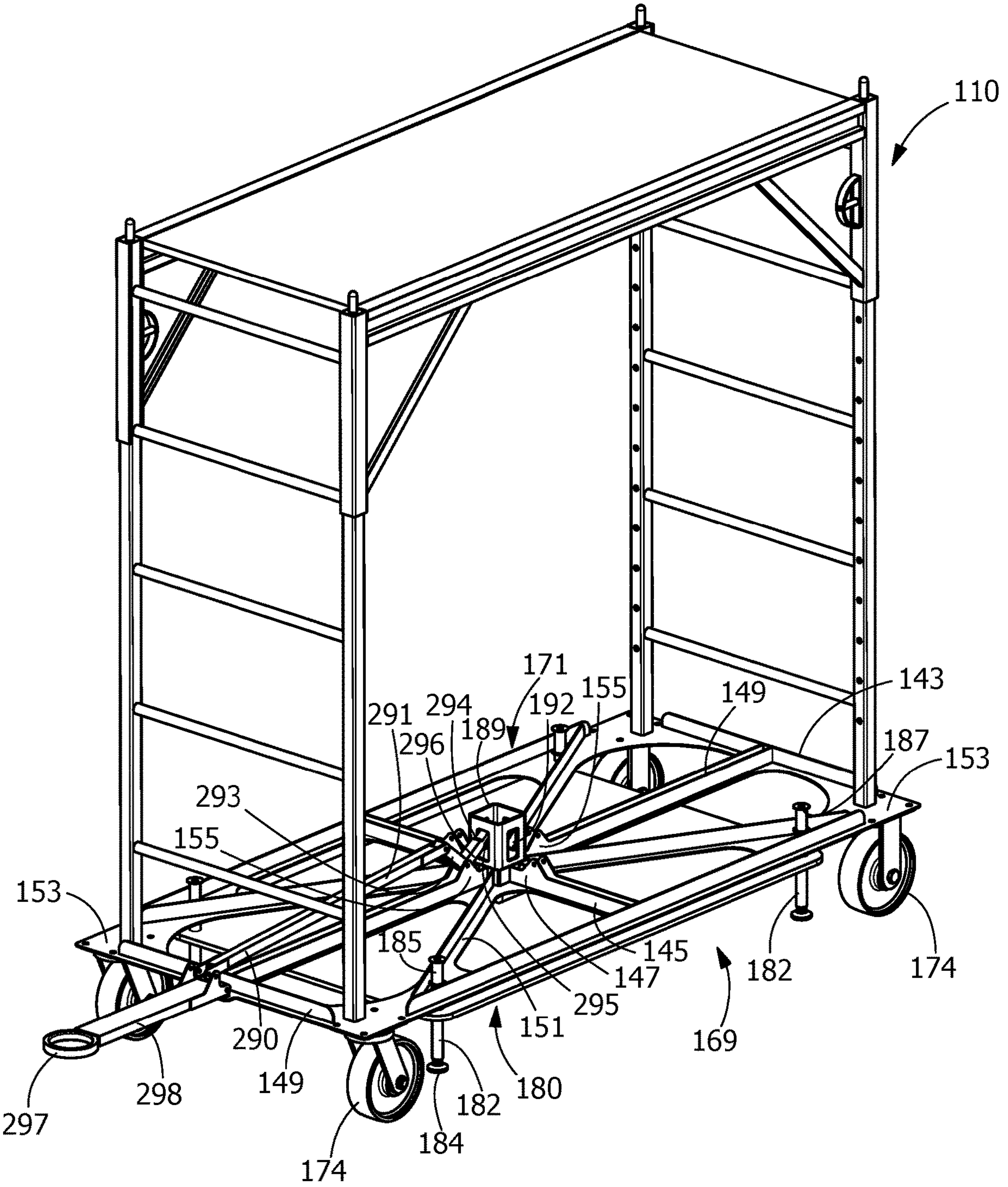
FIG. 21 is a perspective view of the brake/ballast assembly of FIG. 12, showing a fixed member and a movable brake/ballast plate, the movable brake/ballast plate being shown in a first position in which the brake/ballast plate is moved closer to the fixed member to allow the movement of scaffold relative to the deck or surface, the tow hitch is shown in a disengaged position.

One or more second activation members 294, as shown in FIGS. 20 and 21, cooperate with the one or more activation member receiving opening 192. The activation members 294 have first ends 295 which are positioned in the activation member receiving opening 192. Second ends 293 extend away from the engagement member 189. Pivoting portions 296 are provided between the first ends 295 and the second ends 293. The pivoting portions 296 are pivotally mounted to pivoting projections 155 of the first reinforcement and strengthening members 145 and/or the second reinforcement and strengthening members 147.

A hitch assembly or tow bar linkage 290 engages and cooperates with an activation member 294. The hitch assembly 290 has a first end 291 which is configured to cooperate with the second end 293 of an activation members 294. A tow hitch engagement member 297 is provided at the end 298 of the hitch assembly 290 which is opposed to the first end 291. As the hitch assembly 290 is moved between a hitch assembly first position (FIG. 21) and a hitch assembly second position (FIG. 20), the activation member 294 is moved or pivoted about the pivoting portion 296 and pivoting projection 155, allowing the end 298 of the hitch assembly 290 to be moved up and down, causing the first end 295 of the activation member 294 to move the engagement member 189 between the engagement member first position and the engagement member second position.

In use, when it is desired to move the brake/ballast assembly 169 and the scaffold 110 or other movable structure positioned on the brake/ballast assembly 169, the hitch assembly 290 is attached to the second end 293 of the activation members 294. Once properly positioned, the hitch assembly 290 is moved, by an operator, from the hitch assembly second position, shown in FIG. 20, to the hitch assembly first position, shown in FIG. 21. The hitch assembly first position my occur when the tow hitch engagement member 297 is moved downward into engagement with a tow hitch of a vehicle (not shown). As this occurs, the activation member 294 is pivoted causing the first end 295 of the activation member 294 to engage the engagement member 189 to move the engagement member 189 from the engagement member second position, as shown in FIG. 20, to the engagement member first position, as shown in FIG. 21.

With the engagement member 189 moved to the engagement member first position, the movable brake/ballast plate 180 is moved to the movable brake/ballast plate first position, where the movable brake/ballast plate 180 is positioned proximate the fixed member 171, as shown in FIG. 21. In the movable brake/ballast plate first position, the bottom surfaces 184 of the braking projections 182 do not engage and are spaced from the surface 123. In this position, the hitch assembly 290 is used to move, steer and position the brake/ballast assembly 169 and the scaffold 110 or other movable structure to the desired location. As the occurs, the engagement of the tow hitch engagement member 297 with the tow hitch retains the hitch assembly 290 in the activation member first position.

In the movable brake/ballast plate first position, the shoulders 187 of the positioning projections 185 are spaced from the top surface 177 of the fixed plate. In this position, the movable brake/ballast plate 180 and the fixed plate 171 act as independent members.

When the movement of the brake/ballast assembly 169 and the scaffold 110 or other movable structure is to be stopped, the tow hitch engagement member 297 is disengaged from the tow hitch allowing the tow hitch engagement member 297 and the hitch assembly 290 to return to the position shown in FIG. 20. As this occurs the engagement member 189 is moved from the engagement member first position to the engagement member second position.

With the engagement member 189 moved to the engagement member second position, the movable brake/ballast plate 180 is moved to the movable brake/ballast plate second position, where the movable brake/ballast plate 180 is moved away from or is spaced from the fixed plate 171, as shown in FIG. 20. In the movable brake/ballast plate second position, the bottom surfaces 184 of the braking projections 182 are moved into engagement with the surface 123. With the bottom surfaces 184 in engagement with the surface 123, the surface area of the bottom surfaces 184 is sufficient to provide adequate force and resistance to prevent the movement of the braking projections 182 relative to the surface 123, which in turn, prevents the movement of the brake/ballast assembly 169 and the scaffold 110 or other movable structure relative to the surface 123. In this position, the brake/ballast assembly 169 and the scaffold 110 or other movable structure is not movable.

In the movable brake/ballast plate second position, the shoulders 187 of the positioning projections 185 are in engagement with the top surface 177 of the fixed member 171. In this position, the positioning projections 185 cooperate with the fixed member 171, to prevent the movement of the movable braking plate 180 relative to the fixed member 171, allowing the movable brake/ballast plate 80 to provide additional weight and ballast to the fixed member 171, the base 12, the brake/ballast assembly 169 and the scaffold 110 or other movable structure. The cooperation of the movable braking plate 180 with the fixed member 171 provides additional stability to the brake/ballast assembly 169 and the scaffold 110 or other movable structure when the movable braking plate 180 is in the movable brake/ballast plate second position and the brake/ballast assembly 169 and the scaffold 110 or other movable structure is prevented from moving relative to the surface 123.

Due to the configuration of the brake/ballast assembly 169 and it components, when the tow hitch engagement member 297 is disengaged from the tow hitch, the hitch assembly 290 returns to the position shown in FIG. 20, which in turn lowers the movable brake/ballast plate 180 to provide automatic braking of the brake/ballast assembly 169. This provides a failsafe method of braking and securing the brake/ballast assembly 169 and movable structure, preventing the unwanted movement of the brake/ballast assembly 169 and movable structure.

Although the illustrative embodiments shown are used with a movable lifeguard observation station and scaffolding, the braking/ballast assembly and system as described herein can be used with many different types of movable structures. Therefore, the use of the braking/ballast assembly and system is not meant to be limited to the illustrative embodiments shown and described.

The braking/ballast assembly provides a failsafe method of preventing the unwanted movement of the movable structure. Unless the handle or hitch of the braking/ballast assembly is moved downward, the movable structure is maintained in a braked on unmovable position.

In addition, during the moving operation, if the operator loses or relinquishes engagement with the handle or handle assembly, the handle assembly is disengaged causing the handle assembly and the engagement member 189 moved to the engagement member second position, preventing further movement of the braking/ballast assembly and the movable structure. Consequently, the uncontrolled movement of the braking/ballast assembly and the movable structure is prevented.

While the invention has been described with reference to a preferred embodiment, it will be understood by those skilled in the art that various changes may be made and equivalents may be substituted for elements thereof without departing from the spirit and scope of the invention as defined in the accompanying claims. In particular, it will be clear to those skilled in the art that the present invention may be embodied in other specific forms, structures, arrangements, proportions, sizes, and with other elements, materials and components, without departing from the spirit or essential characteristics thereof. One skilled in the art will appreciate that the invention may be used with many modifications of structure, arrangement, proportions, sizes, materials and components and otherwise used in the practice of the invention, which are particularly adapted to specific environments and operative requirements without departing from the principles of the present invention. The presently disclosed embodiments are therefore to be considered in all respects as illustrative and not restrictive, the scope of the invention being defined by the appended claims, and not limited to the foregoing description or embodiments.

The invention claimed is:

1. A movable structure comprising:

a base having a fixed member;

a movable brake/ballast plate movable between a movable brake/ballast plate first position in which the movable brake/ballast plate is positioned proximate the fixed member and a movable brake/ballast plate second position in which the movable brake/ballast plate is spaced from the fixed member, the movable brake/ballast plate extending in a plane which is parallel to a plane of the fixed member, the moveable brake/ballast plate plane is parallel to the plane of the fixed member while in both the first and second positions the movable brake/ballast plate having a weight of greater than 50 pounds;

one or more braking projections extending from the movable brake/ballast plate in a direction away from the fixed member;

one or more positioning projections extend from the movable brake/ballast plate in a direction toward the fixed member, the one or more positioning projections being movably mounted in one or more projection receiving openings of the fixed member;

the one or more positioning projections have shoulders which extend from side surfaces of the one or more positioning projections, the shoulders are spaced from the fixed member when the movable brake/ballast plate is positioned in the movable brake/ballast plate first position, the shoulders are in engagement with the fixed member when the movable brake/ballast plate is positioned in the movable brake/ballast plate second position;

wherein when the movable brake/ballast plate is provided in the movable brake/ballast plate first position, the movable structure is movable along a surface, when the movable brake/ballast plate is provided in the movable brake/ballast plate second position, the movable structure is prevented from moving relative to the surface;

wherein the shoulders of the movable brake/ballast plate engage the fixed member, allowing the movable brake/ballast plate to provide additional ballast for the movable structure to maintain stability of the movable structure.

2. The movable structure as recited in claim 1, wherein the one or more positioning projections are cylindrical members which extend through the one or more projection member receiving openings in the fixed member.

3. The movable structure as recited in claim 1, wherein the fixed member has a weight to act as a ballast for the movable structure to maintain stability of the movable structure, wherein in the movable brake/ballast plate second position, the movable brake/ballast plate engage the fixed member to provide the additional ballast for the movable structure to maintain stability of the movable structure.

4. The movable structure as recited in claim 3, wherein an engagement member is mechanically connected to the movable brake/ballast plate, the engagement member extends through an engagement member receiving opening in the fixed member to a free end of the engagement member, the engagement member is movable between an engagement member first position and an engagement member second position, wherein when the engagement member is in the engagement member first position, the movable brake/ballast plate is provided in the movable brake/ballast plate first position allowing the movable structure to be moved along the surface, when the engagement member is in the engagement member second position, the movable brake/ballast plate is provided in the movable brake/ballast plate second preventing the movable structure from moving relative to the surface.

5. The movable structure as recited in claim 4, wherein wheels are attached to the fixed member, the wheels cooperate with the surface to allow the movable structure to move when the movable brake/ballast plate is positioned in the movable brake/ballast plate first position.

6. A movable structure configured to support at least one person thereon, the movable structure comprising:

a movable brake/ballast assembly having a fixed plate with a weight to stabilize the movable structure and a movable brake/ballast plate with an additional weight, the movable brake/ballast plate being movable between a movable brake/ballast plate first position in which the movable brake/ballast plate is spaced from a surface on which the movable structure is positioned and a movable brake/ballast plate second position in which the movable brake/ballast plate is in engagement with the surface, the movable brake/ballast plate extends in a plane which is parallel to a plane of the fixed plate, the moveable brake/ballast plate plane is parallel to the plane of the fixed member while in both the first and second positions;

an engagement member is connected to the movable brake/ballast plate, the engagement member is movable between an engagement member first position and an engagement member second position, a post of the engagement member is mechanically attached to the movable brake/ballast plate, the post extends through an engagement member receiving opening in the fixed plate;

the movable brake/ballast plate includes one or more positioning projections with shoulders extending from the one or more positioning projections;

wherein when the engagement member is in the engagement member first position, the movable brake/ballast plate is provided in the movable brake/ballast plate first position, when the engagement member is in the engagement member second position, the movable brake/ballast plate is provided in the movable brake/ballast plate second position;

wherein when the movable brake/ballast plate is provided in the movable brake/ballast plate first position, the movable structure is movable along the surface, when the movable brake/ballast plate is provided in the movable brake/ballast plate second position, the movable structure is prevented from moving relative to the surface;

wherein the shoulders of the movable brake/ballast plate engage the fixed member, allowing the additional weight of the movable brake/ballast plate to provide additional ballast for the movable structure to maintain stability of the movable structure.

7. The movable structure as recited in claim 6, wherein wheels are attached to the fixed plate of the movable structure, the wheels cooperate with the surface to allow the movable structure to move when the movable brake/ballast plate is positioned in the movable brake/ballast plate first position.

8. The movable structure as recited in claim 6, wherein the fixed plate is positioned from the surface by a greater distance than the movable brake/ballast plate, one or more positioning projections extend from the movable brake/ballast plate in a direction toward the fixed plate, the one or more positioning projections extend through one or more projection member receiving openings in the fixed member.

9. The movable structure as recited in claim 8, wherein the shoulders are spaced from the fixed plate when the movable brake/ballast plate is positioned in the movable brake/ballast plate first position, the shoulders are engagement with the fixed plate when the movable brake/ballast plate is positioned in the movable brake/ballast plate second position, allowing the fixed member and the movable brake/ballast plate to both provide ballast to the movable structure to maintain stability of the movable structure.

10. The movable structure as recited in claim 6, wherein the engagement member has a hydraulic mechanism to facilitate a movement of the engagement member between the engagement member first position and the engagement member second position and the movement of the movable brake/ballast plate between the movable brake/ballast plate first position and the movable brake/ballast plate second position.

11. The movable structure as recited in claim 6, wherein an activation member is mechanically attached to a free end of the engagement member.

12. The movable structure as recited in claim 11, wherein the activation member is a handle which extends through a handle receiving opening in the movable structure.

13. The movable structure as recited in claim 6, wherein the movable brake/ballast plate has one or more braking projections which extend from the movable brake/ballast plate in a direction away from the fixed plate.

* * * * *